United States Patent
Chavez et al.

(10) Patent No.: US 8,255,006 B1
(45) Date of Patent: Aug. 28, 2012

(54) EVENT DEPENDENT NOTIFICATION SYSTEM AND METHOD

(75) Inventors: John Anthony Chavez, San Francisco, CA (US); Leighton Ridgard, San Jose, CA (US)

(73) Assignee: Fusionone, Inc., San Jose, CA (US)

( * ) Notice: Subject to any disclaimer, the term of this patent is extended or adjusted under 35 U.S.C. 154(b) by 240 days.

(21) Appl. No.: 12/615,644

(22) Filed: Nov. 10, 2009

(51) Int. Cl.
*H04M 1/00* (2006.01)

(52) U.S. Cl. ............ 455/567; 455/412.2; 455/419; 455/420; 379/88.12; 379/207.09; 379/207.1; 379/373.01

(58) Field of Classification Search ........ 455/90.3, 455/412.1, 412.2, 413, 414.1, 415–420, 556.2, 455/566, 567, 575.1, 575.8; 379/88.12, 179, 379/207.08, 207.09, 207.1, 252, 373.01
See application file for complete search history.

(56) References Cited

U.S. PATENT DOCUMENTS

| | | | |
|---|---|---|---|
| 4,887,212 A | 12/1989 | Zamora et al. ............ 364/419 |
| 5,111,398 A | 5/1992 | Nunberg et al. ............ 364/419 |
| 5,115,466 A | 5/1992 | Presttun | |
| 5,130,993 A | 7/1992 | Gutman et al. ............ 371/42 |
| 5,146,221 A | 9/1992 | Whiting et al. ............ 341/67 |
| 5,329,619 A | 7/1994 | Page et al. ............ 395/200 |
| 5,392,390 A | 2/1995 | Crozier ............ 395/161 |
| 5,418,854 A | 5/1995 | Kaufman et al. ............ 713/156 |
| 5,418,908 A | 5/1995 | Keller et al. ............ 395/200 |
| 5,425,079 A | 6/1995 | Noda et al. ............ 379/68 |
| 5,483,352 A | 1/1996 | Fukuyama ............ 358/402 |
| 5,485,161 A | 1/1996 | Vaughn ............ 342/357.13 |
| 5,519,433 A | 5/1996 | Lappington et al. ............ 725/110 |
| 5,519,606 A | 5/1996 | Frid-Nielsen et al. ............ 364/401 |
| 5,543,789 A | 8/1996 | Behr et al. ............ 340/995 |
| 5,544,061 A | 8/1996 | Morimoto et al. ............ 340/995 |
| 5,561,446 A | 10/1996 | Montlick ............ 345/173 |
| 5,574,906 A | 11/1996 | Morris ............ 395/601 |
| 5,579,489 A | 11/1996 | Dornier et al. ............ 395/281 |
| 5,588,009 A | 12/1996 | Will ............ 371/33 |
| 5,592,470 A | 1/1997 | Rudrapatna et al. | |
| 5,623,406 A | 4/1997 | Ichibah ............ 364/999.999 |
| 5,623,661 A | 4/1997 | Hon ............ 395/601 |
| 5,628,005 A | 5/1997 | Hurvig ............ 395/608 |

(Continued)

FOREIGN PATENT DOCUMENTS

CN 1202662 12/1998

(Continued)

OTHER PUBLICATIONS

Anonymous: "Download filter for MMS", Research Disclosure, Mason Publications, Hampshire, GB, vol. 457, No. 28, May 1, 2002, XP007130322, ISSN: 0374-4353.

(Continued)

*Primary Examiner* — Anthony Addy
(74) *Attorney, Agent, or Firm* — Haverstock & Owens LLP

(57) ABSTRACT

An event dependent notification system and method presents a message to a user of a mobile device suggesting the user to perform an action during and/or after an event is detected. The event is detected by an accelerometer or another sensor. In some embodiments, instead of or in addition to a message being presented, the action is automatically taken. The message is able to encourage users to perform actions they do not typically perform or enroll in programs/services they are not currently utilizing, ultimately providing better and/or more secure functionality of the mobile device.

27 Claims, 8 Drawing Sheets

U.S. PATENT DOCUMENTS

| | | | |
|---|---|---|---|
| 5,630,081 A | 5/1997 | Rybicki et al. | 395/348 |
| 5,638,508 A | 6/1997 | Kanai et al. | 714/20 |
| 5,640,577 A | 6/1997 | Scharmer | 395/765 |
| 5,644,709 A | 7/1997 | Austin | |
| 5,647,002 A | 7/1997 | Brunson | 380/49 |
| 5,649,195 A | 7/1997 | Scott et al. | 395/617 |
| 5,650,800 A | 7/1997 | Benson | 345/173 |
| 5,657,372 A * | 8/1997 | Ahlberg et al. | 455/414.1 |
| 5,666,397 A | 9/1997 | Lamons et al. | 379/34 |
| 5,666,553 A | 9/1997 | Crozier | 395/803 |
| 5,682,524 A | 10/1997 | Freund et al. | 395/605 |
| 5,684,990 A | 11/1997 | Boothby | 395/619 |
| 5,694,596 A | 12/1997 | Campbell | 395/610 |
| 5,699,255 A | 12/1997 | Ellis et al. | 701/212 |
| 5,701,423 A | 12/1997 | Crozier | 395/335 |
| 5,706,509 A | 1/1998 | Man-Hak Tso | 395/617 |
| 5,710,922 A | 1/1998 | Alley et al. | 395/617 |
| 5,727,202 A | 3/1998 | Kucala | 395/610 |
| 5,727,950 A | 3/1998 | Cook et al. | 434/350 |
| 5,729,735 A | 3/1998 | Meyering | 395/610 |
| 5,729,739 A | 3/1998 | Cantin et al. | 395/614 |
| 5,729,743 A | 3/1998 | Squibb | 395/619 |
| 5,742,792 A | 4/1998 | Yanai et al. | 395/489 |
| 5,745,750 A | 4/1998 | Porcaro | 707/102 |
| 5,745,906 A | 4/1998 | Squibb | 707/203 |
| 5,757,920 A | 5/1998 | Misra et al. | 380/25 |
| 5,758,150 A | 5/1998 | Bell et al. | 395/610 |
| 5,758,354 A | 5/1998 | Huang et al. | |
| 5,758,355 A | 5/1998 | Buchanan | 707/201 |
| 5,764,899 A | 6/1998 | Eggleston et al. | 709/203 |
| 5,768,480 A | 6/1998 | Crawford, Jr. et al. | |
| 5,768,597 A | 6/1998 | Simm | 395/712 |
| 5,771,354 A | 6/1998 | Crawford | 395/200.59 |
| 5,778,346 A | 7/1998 | Frid-Nielsen et al. | 705/9 |
| 5,778,361 A | 7/1998 | Nanjo et al. | 707/500 |
| 5,778,367 A | 7/1998 | Wesinger et al. | 395/10 |
| 5,778,388 A | 7/1998 | Kawamura et al. | 707/203 |
| 5,781,901 A | 7/1998 | Kuzma | 707/10 |
| 5,787,247 A | 7/1998 | Norin et al. | 395/200.5 |
| 5,787,262 A | 7/1998 | Shakib et al. | 395/200.35 |
| 5,794,228 A | 8/1998 | French et al. | 707/2 |
| 5,804,803 A | 9/1998 | Cragun et al. | 235/375 |
| 5,809,497 A | 9/1998 | Freund et al. | 707/2 |
| 5,812,773 A | 9/1998 | Norin | 395/200.34 |
| 5,812,793 A | 9/1998 | Shakib et al. | 395/200.31 |
| 5,818,437 A | 10/1998 | Grover et al. | 345/811 |
| 5,826,245 A | 10/1998 | Sandberg-Diment | 705/44 |
| 5,832,489 A | 11/1998 | Kucala | 707/10 |
| 5,832,518 A | 11/1998 | Mastors | 707/202 |
| 5,832,519 A | 11/1998 | Bowen et al. | 707/203 |
| 5,832,520 A | 11/1998 | Miller | |
| 5,845,283 A | 12/1998 | Williams et al. | 707/101 |
| 5,859,973 A | 1/1999 | Carpenter | 395/200.33 |
| 5,864,864 A | 1/1999 | Lerner | 707/102 |
| 5,875,296 A | 2/1999 | Shi et al. | 395/188.01 |
| 5,884,323 A | 3/1999 | Hawkins et al. | 707/201 |
| 5,884,325 A | 3/1999 | Bauer et al. | 707/201 |
| 5,893,119 A | 4/1999 | Squibb | 707/203 |
| 5,896,321 A | 4/1999 | Miller | 365/189.01 |
| 5,897,640 A | 4/1999 | Veghte et al. | 707/202 |
| 5,897,642 A | 4/1999 | Capossela et al. | 707/203 |
| 5,903,723 A | 5/1999 | Beck et al. | 709/203 |
| 5,907,793 A | 5/1999 | Reams | 455/3.1 |
| 5,923,756 A | 7/1999 | Shambroom | 713/156 |
| 5,923,848 A | 7/1999 | Goodhand et al. | 395/200.49 |
| 5,926,816 A | 7/1999 | Bauer et al. | 707/8 |
| 5,933,653 A | 8/1999 | Ofek | 395/826 |
| 5,933,778 A | 8/1999 | Buhrmann et al. | |
| 5,933,816 A | 8/1999 | Zeanah et al. | 705/35 |
| 5,935,262 A | 8/1999 | Barrett et al. | 714/46 |
| 5,937,405 A | 8/1999 | Campbell | 707/10 |
| 5,941,944 A | 8/1999 | Messerly | 709/203 |
| 5,943,676 A | 8/1999 | Boothby | 707/201 |
| 5,944,787 A | 8/1999 | Zoken | 709/206 |
| 5,946,615 A | 8/1999 | Holmes et al. | 455/412 |
| 5,948,066 A | 9/1999 | Whalen et al. | 709/229 |
| 5,951,636 A | 9/1999 | Zerber | 709/202 |
| 5,961,572 A | 10/1999 | Craport et al. | 340/990 |
| 5,961,590 A | 10/1999 | Mendez et al. | 709/206 |
| 5,968,131 A | 10/1999 | Mendez et al. | 709/246 |
| 5,970,149 A | 10/1999 | Johnson | 714/46 |
| 5,970,490 A | 10/1999 | Morgenstern | 707/10 |
| 5,971,277 A | 10/1999 | Cragun et al. | 235/462.01 |
| 5,974,238 A | 10/1999 | Chase, Jr. | 395/200.78 |
| 5,974,563 A | 10/1999 | Beeler, Jr. | 714/5 |
| 5,987,381 A | 11/1999 | Oshizawa | 340/990 |
| 5,987,609 A | 11/1999 | Hasebe | 726/35 |
| 5,995,118 A | 11/1999 | Masuda | 345/467 |
| 6,000,000 A | 12/1999 | Hawkins et al. | 707/201 |
| 6,006,215 A | 12/1999 | Retallick | 707/2 |
| 6,006,274 A | 12/1999 | Hawkins et al. | 709/248 |
| 6,009,462 A | 12/1999 | Birrell et al. | 709/206 |
| 6,012,063 A | 1/2000 | Bodnar | 707/101 |
| 6,012,088 A | 1/2000 | Li et al. | 709/219 |
| 6,014,695 A | 1/2000 | Yamashita et al. | 709/219 |
| 6,016,394 A | 1/2000 | Walker | 717/104 |
| 6,016,478 A | 1/2000 | Zhang et al. | 705/9 |
| 6,023,708 A | 2/2000 | Mendez et al. | 707/203 |
| 6,023,723 A | 2/2000 | McCormick et al. | 709/206 |
| 6,026,414 A | 2/2000 | Anglin | 707/204 |
| 6,034,621 A | 3/2000 | Kaufman | 340/825.44 |
| 6,038,665 A | 3/2000 | Bolt et al. | 713/176 |
| 6,044,381 A | 3/2000 | Boothby et al. | 707/201 |
| 6,049,776 A | 4/2000 | Donnelly et al. | 705/8 |
| 6,052,735 A | 4/2000 | Ulrich et al. | 709/236 |
| 6,058,399 A | 5/2000 | Morag et al. | 707/201 |
| 6,061,790 A | 5/2000 | Bodnar | 713/171 |
| 6,061,796 A | 5/2000 | Chen et al. | 713/201 |
| 6,063,134 A | 5/2000 | Peters et al. | |
| 6,064,880 A | 5/2000 | Alanara | 455/419 |
| 6,065,018 A | 5/2000 | Beier et al. | 707/202 |
| 6,073,133 A | 6/2000 | Chrabaszcz | 707/10 |
| 6,076,109 A | 6/2000 | Kikinis | 709/228 |
| 6,078,960 A | 6/2000 | Ballard | 709/229 |
| 6,081,900 A | 6/2000 | Subramaniam et al. | 713/201 |
| 6,094,618 A | 7/2000 | Harada | 701/207 |
| 6,101,480 A | 8/2000 | Conmy et al. | 705/9 |
| 6,108,330 A | 8/2000 | Bhatia et al. | 370/352 |
| 6,108,703 A | 8/2000 | Leighton et al. | 709/226 |
| 6,112,024 A | 8/2000 | Almond et al. | |
| 6,115,797 A | 9/2000 | Kanda et al. | 711/147 |
| 6,131,096 A | 10/2000 | Ng et al. | 707/10 |
| 6,131,116 A | 10/2000 | Riggins et al. | 709/219 |
| 6,141,011 A | 10/2000 | Bodnar et al. | 345/357 |
| 6,141,621 A | 10/2000 | Piwowarski et al. | 340/989 |
| 6,141,659 A | 10/2000 | Barker et al. | 707/102 |
| 6,141,664 A | 10/2000 | Boothby | 707/201 |
| 6,145,088 A | 11/2000 | Stevens | 714/2 |
| 6,148,260 A | 11/2000 | Musk et al. | 701/200 |
| 6,151,606 A | 11/2000 | Mendez | 707/201 |
| 6,157,630 A | 12/2000 | Adler et al. | 370/310 |
| 6,163,773 A | 12/2000 | Kishi | 706/16 |
| 6,163,779 A | 12/2000 | Mantha et al. | 707/100 |
| 6,163,844 A | 12/2000 | Duncan et al. | 713/201 |
| 6,167,120 A | 12/2000 | Kikinis | 379/90.01 |
| 6,173,310 B1 | 1/2001 | Yost et al. | 709/201 |
| 6,173,311 B1 | 1/2001 | Hassett et al. | 709/202 |
| 6,182,117 B1 | 1/2001 | Christie et al. | 709/205 |
| 6,182,141 B1 | 1/2001 | Blum et al. | 709/227 |
| 6,185,598 B1 | 2/2001 | Farber et al. | 709/200 |
| 6,189,030 B1 | 2/2001 | Kirsch et al. | 709/224 |
| 6,189,096 B1 | 2/2001 | Haverty | 713/155 |
| 6,195,695 B1 | 2/2001 | Cheston et al. | 709/221 |
| 6,195,794 B1 | 2/2001 | Buxton | 717/11 |
| 6,202,085 B1 | 3/2001 | Benson et al. | 709/205 |
| 6,205,448 B1 | 3/2001 | Kruglikov et al. | 707/200 |
| 6,209,034 B1 | 3/2001 | Gladwin et al. | 709/227 |
| 6,212,529 B1 | 4/2001 | Boothby et al. | 707/201 |
| 6,212,556 B1 | 4/2001 | Arunachalam | |
| 6,216,131 B1 | 4/2001 | Liu et al. | 707/102 |
| 6,219,680 B1 | 4/2001 | Bernardo et al. | 707/501 |
| 6,219,694 B1 | 4/2001 | Lazaridis et al. | 709/206 |
| 6,223,187 B1 | 4/2001 | Boothby et al. | 707/201 |
| 6,226,650 B1 | 5/2001 | Mahajan et al. | 707/201 |
| 6,233,565 B1 | 5/2001 | Lewis et al. | 705/35 |
| 6,233,589 B1 | 5/2001 | Balcha et al. | 707/203 |
| 6,243,760 B1 | 6/2001 | Armbruster et al. | 709/243 |

| Patent No. | Date | Inventor | Class |
|---|---|---|---|
| 6,246,889 B1 * | 6/2001 | Boltz et al. | 455/567 |
| 6,247,048 B1 | 6/2001 | Greer et al. | 709/219 |
| 6,247,135 B1 | 6/2001 | Feague | 713/400 |
| 6,249,690 B1 | 6/2001 | Mashiko | 455/573 |
| 6,252,547 B1 | 6/2001 | Perry et al. | 342/357.06 |
| 6,255,989 B1 | 7/2001 | Munson et al. | 342/357.13 |
| 6,256,750 B1 | 7/2001 | Takeda | 714/11 |
| 6,260,124 B1 | 7/2001 | Crockett et al. | 711/162 |
| 6,272,545 B1 | 8/2001 | Flanagin et al. | 709/228 |
| 6,275,831 B1 | 8/2001 | Bodnar et al. | 707/201 |
| 6,278,941 B1 | 8/2001 | Yokoyama | 701/209 |
| 6,282,435 B1 | 8/2001 | Wagner et al. | 455/566 |
| 6,282,698 B1 | 8/2001 | Baker et al. | 717/1 |
| 6,285,889 B1 | 9/2001 | Nykanen et al. | 455/557 |
| 6,286,029 B1 | 9/2001 | Delph | 709/203 |
| 6,286,053 B1 | 9/2001 | Van Peursem et al. | 709/999.999 |
| 6,286,085 B1 | 9/2001 | Jouenne et al. | 711/162 |
| 6,289,212 B1 | 9/2001 | Stein et al. | |
| 6,292,743 B1 | 9/2001 | Pu et al. | 455/456 |
| 6,292,905 B1 | 9/2001 | Wallach et al. | 714/4 |
| 6,295,502 B1 | 9/2001 | Hancock et al. | 701/201 |
| 6,295,541 B1 | 9/2001 | Bodnar et al. | 707/203 |
| 6,304,881 B1 | 10/2001 | Halim et al. | 707/201 |
| 6,317,755 B1 | 11/2001 | Rakers et al. | 707/204 |
| 6,321,236 B1 | 11/2001 | Zollinger et al. | 707/201 |
| 6,324,467 B1 | 11/2001 | Machii et al. | 701/200 |
| 6,324,526 B1 | 11/2001 | D'Agostino | 705/44 |
| 6,324,544 B1 | 11/2001 | Alam et al. | 707/201 |
| 6,327,533 B1 | 12/2001 | Chou | 340/988 |
| 6,329,680 B1 | 12/2001 | Yoshida et al. | 257/296 |
| 6,330,568 B1 | 12/2001 | Boothby et al. | 707/201 |
| 6,332,158 B1 | 12/2001 | Risley et al. | 709/219 |
| 6,333,973 B1 | 12/2001 | Smith et al. | 379/88.12 |
| 6,338,096 B1 | 1/2002 | Ukelson | 719/310 |
| 6,339,710 B1 | 1/2002 | Suzuki | 455/458 |
| 6,341,316 B1 | 1/2002 | Kloba et al. | 709/248 |
| 6,345,308 B1 | 2/2002 | Abe | 709/248 |
| 6,349,336 B1 | 2/2002 | Sit et al. | 709/227 |
| 6,353,448 B1 | 3/2002 | Scarborough et al. | 345/349 |
| 6,356,910 B1 | 3/2002 | Zellweger | 707/100 |
| 6,356,961 B1 | 3/2002 | Oprescu-Surcobe | 710/20 |
| 6,360,252 B1 | 3/2002 | Rudy et al. | 709/206 |
| 6,360,330 B1 | 3/2002 | Mutalik et al. | 714/4 |
| 6,363,249 B1 | 3/2002 | Nordeman et al. | 455/418 |
| 6,363,412 B1 | 3/2002 | Niwa et al. | 709/203 |
| 6,374,250 B2 | 4/2002 | Ajtai et al. | 707/101 |
| 6,381,700 B1 | 4/2002 | Yoshida | 713/201 |
| 6,389,462 B1 | 5/2002 | Cohen et al. | 709/218 |
| 6,396,482 B1 | 5/2002 | Griffin et al. | 345/169 |
| 6,397,307 B2 | 5/2002 | Ohran | 711/161 |
| 6,397,351 B1 | 5/2002 | Miller et al. | 714/13 |
| 6,401,104 B1 | 6/2002 | LaRue et al. | 707/203 |
| 6,405,218 B1 | 6/2002 | Boothby | 707/201 |
| 6,418,309 B1 | 7/2002 | Moon et al. | 455/418 |
| 6,434,621 B1 | 8/2002 | Pezzillo et al. | 709/1 |
| 6,434,627 B1 | 8/2002 | Millet et al. | 709/245 |
| 6,437,818 B1 | 8/2002 | Ludwig et al. | 348/14.09 |
| 6,449,622 B1 | 9/2002 | LaRue et al. | 707/201 |
| 6,453,392 B1 | 9/2002 | Flynn, Jr. | 711/151 |
| 6,457,062 B1 | 9/2002 | Pivowar et al. | 709/248 |
| 6,460,036 B1 | 10/2002 | Herz | 707/10 |
| 6,462,644 B1 | 10/2002 | Howell et al. | 340/5.92 |
| 6,463,464 B1 | 10/2002 | Lazaridis et al. | 709/207 |
| 6,466,967 B2 | 10/2002 | Landsman et al. | 709/203 |
| 6,473,621 B1 | 10/2002 | Heie | 455/466 |
| 6,480,896 B1 | 11/2002 | Brown et al. | 709/231 |
| 6,484,143 B1 | 11/2002 | Swildens et al. | 705/1 |
| 6,487,560 B1 | 11/2002 | LaRue et al. | 707/203 |
| 6,523,063 B1 | 11/2002 | Hanson | 709/206 |
| 6,490,655 B1 | 12/2002 | Kershaw | 711/151 |
| 6,496,944 B1 | 12/2002 | Hsiao et al. | 714/15 |
| 6,499,108 B1 | 12/2002 | Johnson | 713/201 |
| 6,505,216 B1 | 1/2003 | Schutzman et al. | |
| 6,507,891 B1 | 1/2003 | Challenger et al. | 711/122 |
| 6,516,314 B1 | 2/2003 | Birkler et al. | |
| 6,516,327 B1 | 2/2003 | Zondervan et al. | 707/200 |
| 6,519,452 B1 | 2/2003 | Agostino et al. | 455/423 |
| 6,523,079 B2 | 2/2003 | Kikinis et al. | 710/303 |
| 6,532,588 B1 | 3/2003 | Porter | 717/170 |
| 6,535,743 B1 | 3/2003 | Kennedy et al. | 455/456.1 |
| 6,539,494 B1 | 3/2003 | Abramson et al. | 714/4 |
| 6,542,933 B1 | 4/2003 | Durst, Jr. et al. | 709/229 |
| 6,546,425 B1 | 4/2003 | Hanson et al. | 709/227 |
| 6,549,933 B1 | 4/2003 | Barrett et al. | 709/203 |
| 6,553,375 B1 | 4/2003 | Huang et al. | 707/10 |
| 6,553,410 B2 | 4/2003 | Kikinis | 709/218 |
| 6,553,413 B1 | 4/2003 | Leighton et al. | 709/219 |
| 6,564,336 B1 | 5/2003 | Majkowski | |
| 6,567,850 B1 | 5/2003 | Freishat et al. | 709/224 |
| 6,567,857 B1 | 5/2003 | Gupta et al. | 709/238 |
| 6,581,065 B1 | 6/2003 | Rodkin et al. | 707/102 |
| 6,584,454 B1 | 6/2003 | Hummel et al. | 705/59 |
| 6,589,290 B1 | 7/2003 | Maxwell et al. | 707/507 |
| 6,591,266 B1 | 7/2003 | Li et al. | 707/10 |
| 6,591,306 B1 | 7/2003 | Redlich | 709/245 |
| 6,591,362 B1 | 7/2003 | Li | 713/1 |
| 6,597,700 B2 | 7/2003 | Golikeri et al. | 370/401 |
| 6,601,143 B1 | 7/2003 | Lamparter | 711/134 |
| 6,609,005 B1 | 8/2003 | Chern | 455/457 |
| 6,628,194 B1 | 9/2003 | Hellebust et al. | |
| 6,636,894 B1 | 10/2003 | Short et al. | 709/225 |
| 6,640,302 B1 | 10/2003 | Subramaniam et al. | 713/169 |
| 6,643,707 B1 | 11/2003 | Booth | 709/245 |
| 6,647,399 B2 | 11/2003 | Zaremba | 707/204 |
| 6,654,746 B1 | 11/2003 | Wong et al. | 707/10 |
| 6,662,212 B1 | 12/2003 | Chandhok et al. | |
| 6,665,721 B1 | 12/2003 | Hind et al. | 709/227 |
| 6,671,724 B1 | 12/2003 | Pandya et al. | 709/226 |
| 6,671,757 B1 | 12/2003 | Multer et al. | 710/100 |
| 6,684,206 B2 | 1/2004 | Chen et al. | 706/61 |
| 6,684,302 B2 | 1/2004 | Kershaw | 711/151 |
| 6,694,335 B1 | 2/2004 | Hopmann et al. | 707/200 |
| 6,694,336 B1 | 2/2004 | Multer et al. | 707/100 |
| 6,701,316 B1 | 3/2004 | Li et al. | 707/10 |
| 6,704,849 B2 | 3/2004 | Steegmans | 711/162 |
| 6,714,987 B1 | 3/2004 | Amin et al. | 709/249 |
| 6,718,348 B1 | 4/2004 | Novak et al. | 707/201 |
| 6,718,390 B1 | 4/2004 | Still et al. | 709/229 |
| 6,725,239 B2 | 4/2004 | Sherman et al. | 707/201 |
| 6,728,530 B1 | 4/2004 | Heinonen et al. | 455/414.1 |
| 6,732,101 B1 | 5/2004 | Cook | 707/10 |
| 6,732,264 B1 | 5/2004 | Sun et al. | 713/2 |
| 6,738,789 B2 | 5/2004 | Multer et al. | 707/101 |
| 6,741,851 B1 | 5/2004 | Lee et al. | 455/410 |
| 6,745,040 B2 | 6/2004 | Zimmerman | 455/458 |
| 6,757,696 B2 | 6/2004 | Multer et al. | 707/1 |
| 6,757,698 B2 | 6/2004 | McBride et al. | 707/204 |
| 6,757,712 B1 | 6/2004 | Bastian et al. | 709/206 |
| 6,781,575 B1 | 8/2004 | Hawkins et al. | 345/173 |
| 6,795,848 B1 | 9/2004 | Border et al. | 709/213 |
| 6,799,214 B1 | 9/2004 | Li | 709/226 |
| 6,804,690 B1 | 10/2004 | Dysert et al. | 707/204 |
| 6,804,783 B1 | 10/2004 | Wesinger, Jr. et al. | 713/200 |
| 6,810,411 B1 | 10/2004 | Coughlin et al. | |
| 6,812,961 B1 | 11/2004 | Parulski et al. | 348/231.2 |
| 6,813,487 B1 | 11/2004 | Trommelen | 455/404.1 |
| 6,816,481 B1 | 11/2004 | Adams et al. | 370/352 |
| 6,829,654 B1 | 12/2004 | Jungck | 709/246 |
| 6,836,657 B2 | 12/2004 | Ji et al. | 455/419 |
| 6,836,765 B1 | 12/2004 | Sussman | 705/41 |
| 6,839,022 B1 | 1/2005 | Benco et al. | |
| 6,839,568 B2 | 1/2005 | Suzuki | 455/550.1 |
| 6,842,695 B1 | 1/2005 | Tu et al. | 701/213 |
| 6,850,944 B1 | 2/2005 | MacCall et al. | 707/100 |
| 6,868,451 B1 | 3/2005 | Peacock | 709/231 |
| 6,870,921 B1 | 3/2005 | Elsey et al. | 379/218.01 |
| 6,886,013 B1 | 4/2005 | Beranek | 707/10 |
| 6,892,225 B1 | 5/2005 | Tu et al. | 709/217 |
| 6,892,245 B1 | 5/2005 | Crump et al. | 709/245 |
| 6,904,449 B1 | 6/2005 | Quinones | 709/203 |
| 6,904,460 B1 | 6/2005 | Raciborski et al. | 709/224 |
| 6,920,488 B1 | 7/2005 | Le Pennec et al. | 709/219 |
| 6,925,476 B1 | 8/2005 | Multer | 707/200 |
| 6,925,477 B1 | 8/2005 | Champagne et al. | 707/203 |
| 6,934,767 B1 | 8/2005 | Jellinek | 709/247 |
| 6,944,651 B2 | 9/2005 | Onyon et al. | 709/204 |
| 6,944,676 B1 | 9/2005 | Armbruster et al. | 709/243 |
| 6,954,660 B2 | 10/2005 | Aoyama | 455/572 |

| Patent/Pub No. | Date | Inventor | Class |
|---|---|---|---|
| 6,954,783 B1 | 10/2005 | Bodwell et al. | 709/218 |
| 6,959,331 B1 | 10/2005 | Traversat et al. | |
| 6,963,914 B1 | 11/2005 | Breitbart et al. | 709/226 |
| 6,973,299 B2 | 12/2005 | Apfel | 455/412.2 |
| 6,975,709 B2 * | 12/2005 | Wullert, II | 379/88.23 |
| 6,996,617 B1 | 2/2006 | Aiken, Jr. et al. | |
| 6,996,631 B1 | 2/2006 | Aiken, Jr. et al. | 709/242 |
| 7,003,555 B1 | 2/2006 | Jungck | 709/219 |
| 7,003,668 B2 | 2/2006 | Berson et al. | 713/182 |
| 7,007,041 B2 | 2/2006 | Multer et al. | 707/10 |
| 7,010,578 B1 | 3/2006 | Lewin et al. | 709/217 |
| 7,016,964 B1 | 3/2006 | Still et al. | 709/229 |
| 7,023,868 B2 | 4/2006 | Rabenko et al. | 370/419 |
| 7,024,491 B1 | 4/2006 | Hanmann et al. | |
| 7,030,730 B1 | 4/2006 | Zondervan | |
| 7,035,878 B1 | 4/2006 | Multer et al. | 707/201 |
| 7,039,656 B1 | 5/2006 | Tsai et al. | 707/201 |
| 7,051,275 B2 | 5/2006 | Gupta et al. | 715/512 |
| 7,054,594 B2 | 5/2006 | Bloch et al. | 455/41.2 |
| 7,054,952 B1 | 5/2006 | Schwerdtfeger et al. | 709/246 |
| 7,082,476 B1 | 7/2006 | Cohen et al. | |
| 7,085,817 B1 | 8/2006 | Tock et al. | 709/217 |
| 7,096,418 B1 | 8/2006 | Singhal et al. | 715/501.1 |
| 7,099,915 B1 | 8/2006 | Tenereillo et al. | 709/203 |
| 7,103,794 B2 | 9/2006 | Malcolm et al. | 714/4 |
| 7,107,043 B2 * | 9/2006 | Aoyama | 455/412.1 |
| 7,110,954 B2 | 9/2006 | Yung et al. | 705/1 |
| 7,116,681 B1 | 10/2006 | Hovell et al. | 370/466 |
| 7,133,503 B2 * | 11/2006 | Revisky et al. | 379/88.12 |
| 7,146,161 B2 | 12/2006 | Chou | 455/418 |
| 7,158,805 B1 | 1/2007 | Park et al. | |
| 7,162,494 B2 | 1/2007 | Arellano | 707/104.1 |
| 7,167,728 B1 | 1/2007 | Wagner et al. | 455/566 |
| 7,181,628 B2 | 2/2007 | Sato et al. | 713/189 |
| 7,197,574 B1 | 3/2007 | Ishiyama | 709/245 |
| 7,233,791 B2 | 6/2007 | Gilbert et al. | 455/419 |
| 7,237,027 B1 | 6/2007 | Raccah et al. | |
| 7,249,175 B1 | 7/2007 | Donaldson | 709/225 |
| 7,269,433 B2 | 9/2007 | Vargas et al. | 455/502 |
| 7,284,051 B1 | 10/2007 | Okano et al. | 709/226 |
| 7,289,964 B1 | 10/2007 | Bowman-Amuah | 705/1 |
| 7,293,074 B1 | 11/2007 | Jellinek et al. | 709/205 |
| 7,315,826 B1 | 1/2008 | Guheen et al. | 705/7 |
| 7,317,907 B2 | 1/2008 | Linkert et al. | 455/412.1 |
| 7,328,341 B1 | 2/2008 | Eun et al. | |
| 7,343,568 B2 | 3/2008 | Jiang et al. | 715/854 |
| 7,349,719 B2 | 3/2008 | Buniatyan | 455/557 |
| 7,356,559 B1 | 4/2008 | Jacobs et al. | 709/203 |
| 7,363,233 B1 | 4/2008 | Levine | 705/1 |
| 7,383,061 B1 | 6/2008 | Hawkins | 455/556.2 |
| 7,392,034 B2 | 6/2008 | Westman et al. | 455/402 |
| 7,415,486 B2 | 8/2008 | Multer et al. | 709/201 |
| 7,440,746 B1 | 10/2008 | Swan | 455/412.1 |
| 7,447,743 B1 | 11/2008 | Jordan, Jr. | 709/206 |
| 7,454,500 B1 | 11/2008 | Hsu et al. | 709/226 |
| 7,499,888 B1 | 3/2009 | Tu et al. | 705/44 |
| 7,505,762 B2 | 3/2009 | Onyon et al. | 455/419 |
| 7,519,702 B1 | 4/2009 | Allan | 709/224 |
| 7,539,697 B1 | 5/2009 | Akella et al. | |
| 7,587,398 B1 | 9/2009 | Fredricksen et al. | |
| 7,596,609 B1 | 9/2009 | Refuah et al. | |
| 7,643,824 B2 * | 1/2010 | Onyon et al. | 455/419 |
| 7,663,652 B1 | 2/2010 | Reese | |
| 7,707,150 B2 | 4/2010 | Sundararajan et al. | |
| 7,764,782 B1 * | 7/2010 | Coughlan et al. | 379/373.01 |
| 7,853,664 B1 | 12/2010 | Wang et al. | |
| 7,957,772 B2 * | 6/2011 | Charlier et al. | 455/569.1 |
| 8,044,818 B2 * | 10/2011 | Tysowski et al. | 340/669 |
| 2001/0014893 A1 | 8/2001 | Boothby | 707/201 |
| 2001/0028363 A1 | 10/2001 | Nomoto et al. | |
| 2001/0034737 A1 | 10/2001 | Cane et al. | |
| 2001/0044805 A1 | 11/2001 | Multer et al. | 707/201 |
| 2001/0047393 A1 | 11/2001 | Arner et al. | 709/216 |
| 2001/0047471 A1 | 11/2001 | Johnson | 713/1 |
| 2001/0051920 A1 | 12/2001 | Joao et al. | 705/41 |
| 2001/0056473 A1 | 12/2001 | Arneson et al. | |
| 2002/0007303 A1 | 1/2002 | Brokler et al. | 705/10 |
| 2002/0010868 A1 | 1/2002 | Nakashima et al. | 713/201 |
| 2002/0016818 A1 | 2/2002 | Kirani et al. | 709/206 |
| 2002/0016912 A1 | 2/2002 | Johnson | 713/165 |
| 2002/0023136 A1 | 2/2002 | Silver et al. | |
| 2002/0032751 A1 | 3/2002 | Bharadwaj | 709/218 |
| 2002/0040369 A1 | 4/2002 | Multer et al. | 707/200 |
| 2002/0049852 A1 | 4/2002 | Lee et al. | 709/231 |
| 2002/0055909 A1 | 5/2002 | Fung et al. | 705/42 |
| 2002/0056011 A1 | 5/2002 | Nardone et al. | 709/248 |
| 2002/0059116 A1 | 5/2002 | Bulatovic et al. | 705/27 |
| 2002/0062365 A1 | 5/2002 | Nishikawa et al. | 709/223 |
| 2002/0067816 A1 | 6/2002 | Bushnell | 379/201.02 |
| 2002/0069178 A1 | 6/2002 | Hoffman | |
| 2002/0073212 A1 | 6/2002 | Sokol et al. | 709/229 |
| 2002/0078075 A1 | 6/2002 | Colson et al. | 707/204 |
| 2002/0082995 A1 | 6/2002 | Christie | 705/44 |
| 2002/0083325 A1 | 6/2002 | Mediratta et al. | 713/191 |
| 2002/0091785 A1 | 7/2002 | Ohlenbusch et al. | 709/208 |
| 2002/0116444 A1 | 8/2002 | Chaudhri et al. | 709/201 |
| 2002/0120600 A1 | 8/2002 | Schiavone et al. | 707/1 |
| 2002/0126814 A1 | 9/2002 | Awada et al. | |
| 2002/0128908 A1 | 9/2002 | Levin et al. | 705/14 |
| 2002/0138582 A1 | 9/2002 | Chandra et al. | 709/206 |
| 2002/0138765 A1 | 9/2002 | Fishman et al. | 713/201 |
| 2002/0152278 A1 | 10/2002 | Pontenzone et al. | |
| 2002/0162011 A1 | 10/2002 | Tanaka et al. | 713/200 |
| 2002/0168964 A1 | 11/2002 | Kraft | |
| 2002/0168975 A1 | 11/2002 | Gresham et al. | |
| 2002/0194196 A1 | 12/2002 | Weinberg et al. | |
| 2003/0021274 A1 | 1/2003 | Siikaniemi et al. | |
| 2003/0028451 A1 | 2/2003 | Ananian | 705/27 |
| 2003/0028554 A1 | 2/2003 | Koskimies et al. | 707/201 |
| 2003/0028603 A1 | 2/2003 | Aktas et al. | |
| 2003/0028647 A1 | 2/2003 | Grosu | |
| 2003/0037020 A1 | 2/2003 | Novak et al. | 707/1 |
| 2003/0046433 A1 | 3/2003 | Luzzatti et al. | |
| 2003/0061163 A1 | 3/2003 | Durfield | 705/44 |
| 2003/0065934 A1 | 4/2003 | Angelo et al. | 713/200 |
| 2003/0069874 A1 | 4/2003 | Hertzog et al. | 707/1 |
| 2003/0084121 A1 | 5/2003 | De Boor et al. | 709/218 |
| 2003/0093797 A1 | 5/2003 | Bazzaz | |
| 2003/0115240 A1 | 6/2003 | Cho | |
| 2003/0134625 A1 | 7/2003 | Choi | 455/418 |
| 2003/0135463 A1 | 7/2003 | Brown et al. | 705/44 |
| 2003/0139172 A1 | 7/2003 | Lampela et al. | 455/415 |
| 2003/0172236 A1 | 9/2003 | Iyengar et al. | |
| 2003/0204568 A1 | 10/2003 | Bhargava et al. | 709/206 |
| 2003/0208546 A1 | 11/2003 | Desalvo et al. | 709/206 |
| 2003/0224760 A1 | 12/2003 | Day | 455/412.1 |
| 2003/0229898 A1 | 12/2003 | Babu et al. | 725/87 |
| 2003/0233383 A1 | 12/2003 | Koskimies | 707/204 |
| 2004/0054746 A1 | 3/2004 | Shibata | 709/207 |
| 2004/0058673 A1 | 3/2004 | Irlam et al. | |
| 2004/0093317 A1 | 5/2004 | Swan | 707/10 |
| 2004/0093342 A1 | 5/2004 | Arbo et al. | 707/102 |
| 2004/0093385 A1 | 5/2004 | Yamagata | 709/206 |
| 2004/0111465 A1 | 6/2004 | Chuang et al. | 709/203 |
| 2004/0120477 A1 | 6/2004 | Nguyen et al. | |
| 2004/0128324 A1 | 7/2004 | Sheynman et al. | |
| 2004/0132428 A1 | 7/2004 | Mulligan | 455/411 |
| 2004/0142711 A1 | 7/2004 | Mahonen et al. | 455/502 |
| 2004/0146150 A1 | 7/2004 | Barnes | |
| 2004/0148408 A1 | 7/2004 | Nadarajah | |
| 2004/0162063 A1 | 8/2004 | Shirwadkar et al. | 707/10 |
| 2004/0192260 A1 | 9/2004 | Sugimoto et al. | 455/412.1 |
| 2004/0192282 A1 | 9/2004 | Vasudevan | 455/419 |
| 2004/0193953 A1 | 9/2004 | Callahan et al. | 714/15 |
| 2004/0204120 A1 | 10/2004 | Jiles | 455/564 |
| 2004/0224665 A1 | 11/2004 | Kokubo | 455/411 |
| 2004/0235523 A1 | 11/2004 | Schrire et al. | 455/558 |
| 2004/0267390 A1 | 12/2004 | Ben-Yaacov et al. | |
| 2004/0267944 A1 | 12/2004 | Britt | 709/229 |
| 2005/0021571 A1 | 1/2005 | East | 707/101 |
| 2005/0032527 A1 | 2/2005 | Sheha et al. | 455/456.1 |
| 2005/0038863 A1 | 2/2005 | Onyon et al. | 709/206 |
| 2005/0044404 A1 | 2/2005 | Bhansali et al. | 713/200 |
| 2005/0060392 A1 | 3/2005 | Goring et al. | 709/220 |
| 2005/0064859 A1 | 3/2005 | Kotzin et al. | 455/419 |
| 2005/0086296 A1 | 4/2005 | Chi et al. | 709/203 |
| 2005/0086318 A1 | 4/2005 | Aubault | 709/213 |
| 2005/0090253 A1 | 4/2005 | Kim et al. | 455/435.1 |

| | | | |
|---|---|---|---|
| 2005/0096975 A1 | 5/2005 | Moshe | |
| 2005/0099963 A1 | 5/2005 | Multer et al. | 707/10 |
| 2005/0100150 A1 | 5/2005 | Dhara et al. | 379/142.01 |
| 2005/0102257 A1 | 5/2005 | Onyon et al. | 709/206 |
| 2005/0102328 A1 | 5/2005 | Ring et al. | 707/204 |
| 2005/0131990 A1 | 6/2005 | Jewell | 709/201 |
| 2005/0144200 A1 | 6/2005 | Hesselink et al. | |
| 2005/0144251 A1 | 6/2005 | Slate | |
| 2005/0203971 A1 | 9/2005 | Koskimies et al. | 707/203 |
| 2005/0203992 A1 | 9/2005 | Tanaka et al. | |
| 2005/0204001 A1 | 9/2005 | Stein et al. | 709/206 |
| 2005/0210101 A1 | 9/2005 | Janik | 709/203 |
| 2005/0216300 A1 | 9/2005 | Appelman et al. | |
| 2005/0227674 A1 | 10/2005 | Kopra et al. | |
| 2005/0227740 A1* | 10/2005 | Orbach | 455/567 |
| 2005/0240494 A1 | 10/2005 | Cue et al. | |
| 2005/0273632 A1 | 12/2005 | Kawakami | |
| 2006/0021059 A1 | 1/2006 | Brown et al. | 455/410 |
| 2006/0035647 A1 | 2/2006 | Eisner et al. | 455/456.1 |
| 2006/0052091 A1 | 3/2006 | Onyon et al. | 455/415 |
| 2006/0095397 A1 | 5/2006 | Torres et al. | |
| 2006/0129627 A1 | 6/2006 | Phillips et al. | |
| 2006/0190626 A1 | 8/2006 | Bhogal et al. | 709/248 |
| 2006/0212482 A1 | 9/2006 | Celik | 707/104.1 |
| 2006/0233335 A1 | 10/2006 | Pfleging et al. | |
| 2007/0037605 A1* | 2/2007 | Logan | 455/567 |
| 2007/0043739 A1 | 2/2007 | Takai et al. | |
| 2007/0047533 A1 | 3/2007 | Criddle et al. | |
| 2007/0050734 A1 | 3/2007 | Busey | 715/853 |
| 2007/0053335 A1 | 3/2007 | Onyon et al. | 370/343 |
| 2007/0056043 A1 | 3/2007 | Onyon et al. | 713/189 |
| 2007/0061331 A1 | 3/2007 | Ramer et al. | 707/10 |
| 2007/0082668 A1 | 4/2007 | Silver et al. | 455/432.3 |
| 2007/0094042 A1 | 4/2007 | Ramer et al. | 705/1 |
| 2007/0214149 A1 | 9/2007 | Bodin et al. | |
| 2007/0220419 A1 | 9/2007 | Stibel et al. | |
| 2007/0226272 A1 | 9/2007 | Huang et al. | 707/201 |
| 2007/0254697 A1* | 11/2007 | Sugio et al. | 455/556.2 |
| 2008/0005282 A1 | 1/2008 | Gaedcke | |
| 2008/0009268 A1 | 1/2008 | Ramer et al. | 455/412.1 |
| 2008/0022220 A1 | 1/2008 | Cheah | 715/769 |
| 2008/0037743 A1* | 2/2008 | Bishop | 379/201.01 |
| 2008/0039020 A1 | 2/2008 | Eskin | 455/41.2 |
| 2008/0059897 A1 | 3/2008 | Dilorenzo | |
| 2008/0064378 A1 | 3/2008 | Kahan et al. | |
| 2008/0082421 A1 | 4/2008 | Onyon et al. | 705/14 |
| 2008/0127289 A1 | 5/2008 | Julia et al. | |
| 2008/0201362 A1 | 8/2008 | Multer et al. | 707/103 R |
| 2008/0214163 A1 | 9/2008 | Onyon et al. | 455/414.2 |
| 2008/0268823 A1 | 10/2008 | Shalev et al. | |
| 2008/0273755 A1* | 11/2008 | Hildreth | 382/103 |
| 2008/0294768 A1 | 11/2008 | Sampson et al. | |
| 2009/0012940 A1 | 1/2009 | Ives et al. | |
| 2009/0037828 A1 | 2/2009 | Waite et al. | |
| 2009/0055464 A1 | 2/2009 | Multer et al. | 709/201 |
| 2009/0106110 A1 | 4/2009 | Stannard et al. | 455/419 |
| 2009/0138546 A1 | 5/2009 | Cruzada | |
| 2009/0186672 A1* | 7/2009 | Duff et al. | 455/575.8 |
| 2009/0232480 A1* | 9/2009 | Jendbro | 386/117 |
| 2009/0327305 A1 | 12/2009 | Roberts et al. | |
| 2010/0056226 A1* | 3/2010 | Bansal et al. | 455/567 |
| 2010/0159998 A1* | 6/2010 | Luke et al. | 455/567 |
| 2010/0190475 A1* | 7/2010 | El-Kadri et al. | 455/412.2 |
| 2010/0319434 A1* | 12/2010 | Weber et al. | 73/12.06 |
| 2011/0109170 A1* | 5/2011 | Chen et al. | 307/121 |

FOREIGN PATENT DOCUMENTS

| | | |
|---|---|---|
| CN | 1455522 | 11/2003 |
| CN | 1313697 | 2/2005 |
| CN | 2003-122958 | 7/2006 |
| EP | 0930593 A | 7/1991 |
| EP | 0801487 A2 | 10/1997 |
| EP | 0836131 A2 | 4/1998 |
| EP | 0836301 A | 4/1998 |
| EP | 0924917 A2 | 6/1999 |
| EP | 1024441 A2 | 2/2000 |
| EP | 0986225 A1 | 3/2000 |
| EP | 1139608 A2 | 10/2001 |
| EP | 1180890 A2 | 2/2002 |
| EP | 1263244 A2 | 4/2002 |
| EP | 2043012 A1 | 4/2009 |
| FR | 1998-106683 | 4/1998 |
| GB | 2366050 A | 6/2001 |
| JP | 7303146 A | 11/1995 |
| JP | 10191453 | 7/1998 |
| JP | 11242620 | 9/1999 |
| JP | 11242677 | 9/1999 |
| JP | 2000232680 A | 8/2000 |
| JP | 2000316053 A | 11/2000 |
| JP | 2002142254 A | 5/2002 |
| JP | 2002185575 A | 6/2002 |
| JP | 2002247144 A | 8/2002 |
| JP | 2002314689 A | 10/2002 |
| JP | 2003259011 A | 9/2003 |
| WO | WO 97/04391 | 2/1997 |
| WO | WO 97/39564 | 10/1997 |
| WO | WO 97/41520 | 11/1997 |
| WO | WO 98/03005 | 1/1998 |
| WO | WO 98/21648 | 5/1998 |
| WO | WO 98/29994 A | 7/1998 |
| WO | WO 98/54662 | 12/1998 |
| WO | WO 98/56159 A | 12/1998 |
| WO | WO 99/05813 | 2/1999 |
| WO | WO 99/06900 | 2/1999 |
| WO | WO 99/36870 | 7/1999 |
| WO | WO 99/40514 | 8/1999 |
| WO | WO 99/45451 | 9/1999 |
| WO | WO 99/45484 | 9/1999 |
| WO | WO 99/46701 A | 9/1999 |
| WO | WO 99/50761 | 10/1999 |
| WO | WO 99/65256 | 12/1999 |
| WO | WO 00/11832 | 3/2000 |
| WO | WO 00/16222 | 3/2000 |
| WO | WO 00/29998 | 5/2000 |
| WO | 0133874 A1 | 5/2001 |
| WO | WO 01/71539 | 9/2001 |
| WO | WO 01/80535 A1 | 9/2001 |
| WO | 0217140 A2 | 2/2002 |
| WO | 03056789 A1 | 7/2003 |
| WO | 03-083716 A1 | 10/2003 |
| WO | WO 2005/112586 A2 | 12/2005 |

OTHER PUBLICATIONS

Intellisync Email Accelerator, A detailed guide to functionality-Product functionality paper, Mar. 2004, pp. 1-18.
Lee et al, "Monitoring Data Archives for Grid Environments," Jul. 2002, 10 pgs.
Batista et al. "Mining Web Access Logs of an On-line Newspaper" Jul. 2002, 8 pgshttp://ectrl.itc.it/rpec/.
Finnigan, Anne, "The Safe Way to Shop Online," Sep. 1998, p. 162, Good Housekeeping, v. 227 No. 3.
Chase, Larry, "Taking Transactions Online,"Oct. 1998, pp. 124-132, Target Marketing, v.21 No. 10.
Gong, Li, "Increasing Availability and Security of an Authentication Service," Jun. 1993, pp. 657-662, IEEE Journal on Selected Areas in Communications, v. 11 No. 5.
Demaio, Harry B., "My MIPS Are Sealed," Sep./Oct. 1993, pp. 46-51, Chief Information Officer Journal, v. 5 issue 7.
Internet Mail Consortium: :vCard Overview, Oct. 13, 1998, 3 pages, Retrieved from the Internet: www.imc.org/pdi/vcardoverview.
Internet Mail Consortium: :vCard The Electronic Business Card, Jan. 1, 1997, 5 pages, Retrieved from the Internet: www.imc.org/pdi/vcardwhite.html.
Jennings, J. "SyncML DM: A SyncML Protocol for Device Management,"slide presentation, downloaded from www.openalliance.org/tech/affiliates/syncml/syncmldm_28jan02_james_jennings.pdf, Jan. 28, 2002, 23 pgs.
Toroi, T. "The SyncML Road Ahead—Application Development and Device Management," slide presentation, downloaded from www.openalliance.org/tech/affiliates/syncml/syncmldm_30jan02_teemu_Toroi.pdf, Jan. 30, 2002.
Sheha, M.A.et al. "Specification and Drawings of U.S. Appl. No. 60/493,704," filed Aug. 8, 2003.
FusionOne "FusionOne Unveils Integrated Carrier Product Suite to Deliver Mobility Solutions to Individuals and the Enterprise,"Press Release, Mar. 18, 2002, 3 pgs.

FusionOne "FusionOne Unveils Mighty Phone™ Wireless Service," Press Release, Nov. 18, 2002, 3 pgs.

Business Wire, "SyncML Announces 18 New Compliant Products, SyncML DM Engineering Event Held; 99 Devices No Certified SyncML Compliant," Press Release, Sep. 25, 2002.

Reed, Benjamin C., et al., "Authenticating Network-Attached Stomge," IEEE, Jan.-Feb. 2000, pp. 49-57.

Gaskin J.E.: Messaging-Instant Enterprise—Once a Novelty item, IM is Becoming a More Serious Tool for Business Users, InternetWeek, No. 810, Apr. 24, 2000, p. 55.

BusinessWire, "FusionOne Partners with WhitePages.com to Deliver Automatic Synchronization for Online Subscriber," press release, Oct. 11, 2000.

Pabla C. "SyncML Intensive," downloaded from www-128.ibm.com/developerworks/wireless/library/we-syncml2, Apr. 1, 2002.

Malone, et al., Semi-Structured Messages are Surprisingly Useful for Computer-Supported Coordination, Proceedings of the Conference on Computer-Supported Cooperative Work, Austin, Texas, Dec. 3-5, 1986, pp. 1-26.

Patel et al., "The Multimedia Fax-MIME Gateway," 8440 IEEE MultiMedia No. 4, Jan. 1994, 7 pgs.

Lamb et al., "LAN-Based Office for the Enterprise, A Case Study," Advantis Company, White Plains, NY 10605, Jan. 1994 IEEE, pp. 440-447.

Starfish, "TrueSync Data Synchronization," Software, http://www.starfishsoftware.com/solutions/data/data.html, Jan. 2003.

Rou et al., "Online File Storage System," 2002 Student Conference on Research and Development Proceedings, Shah Alam, Malaysia, Nov. 7, 2002, IEEE, pp. 83-86.

Agarwal et al., "On the Scalability of Data Synchronization Protocols for PDAs and Mobile Devices," Jul. 2002, IEEE Network, pp. 22-28.

Scanniello, Giuseppe et al., "An Approach and an Eclipse Based Environment for Data Migration," University of Basilicata, IEEE 2008, pp. 237-246.

"Secure Hash Algorithm", Wikipedia, accessed Feb. 28, 2012, <http://en.wikipedia.org/wiki/Secure_Hash_Algorithm>.

* cited by examiner

EVENT DEPENDENT NOTIFICATION SYSTEM AND METHOD

FIELD OF THE INVENTION

The present invention relates to the field of computing. More specifically, the present invention relates to the field of notifying mobile device users based on events.

BACKGROUND OF THE INVENTION

Wireless communication devices, such as mobile telephones, have expanded beyond merely mechanisms for communication. Many telephones include features enabling personal productivity, games and even digital cameras. Devices which include personal productivity applications may include data storage for storing the owner's personal information within the storage devices. In addition, phones now have the ability to run application programs specifically designed for phone-based runtime environments.

All of an individual's personal information operated on and stored by a user can be considered within that user's "personal information space." In this context, a "personal information space" is a data store of information customized by, and on behalf of the user which contains both public data the user puts into their personal space, private events in the space, and other data objects such as text files or data files which belong to the user and are manipulated by the user. The personal information space is defined by the content which is specific to and controlled by an individual user, generally entered by or under the control of the individual user, and which includes "public" events and data, those generally known to others, and "private" events and data which are not intended to be shared with others. It should be recognized that each of the aforementioned criteria is not exclusive or required, but defines characteristics of the term "personal information space" as that term is used herein. In this context, such information includes electronic files such as databases, text files, word processing files, and other application specific files, as well as contact information in personal information managers, PDAs and cellular phones.

One difficulty users face is that it can be time consuming to enter information into a telephone, and once entered, the information is subject to loss. If the phone is damaged or simply lost by the user, the time and effort spent to enter the information into the phone is lost. Also, the data itself is lost. Some phones come with software and data connection cables allowing users to enter and backup information stored on a telephone by physically connecting the telephone to a personal computer. Many of these applications are provided by the manufacturer of the phone and are customized to interact directly with the phone. That is, the application program is generally specifically designed for the telephone to retrieve data from the telephone and store it in the application on a personal computer. In addition, some third party vendors have attempted to make more universal synchronization systems that interact with phones through the physical cable. Moreover, Mighty Backup or SIM backup to a server/remote service.

The trouble with these physical connection mechanisms is that the user must consciously remember to physically connect the phone to the computer on a regular basis in order to ensure that the information backed up on the computer is accurate. In addition, the computer itself is subject to volatility. The data on the computer may be lost or damaged due to hardware and software failures.

While phone users generally desire increased functionality in phone based applications, they also desire the applications be relatively easy to use. Even general computer based utility applications, such as data back-up applications, are advantageous if they are set to run without significant user intervention. Furthermore, users may not even be aware of data back-up applications available for use on/with the phone. Therefore, a solution is needed to further ensure users do not lose their data.

SUMMARY OF THE INVENTION

An acceleration, pressure, altitude, temperature, moisture and/or other event dependent notification system and method presents a message to a user of a mobile device suggesting the user to perform an action during and/or after an event is detected. The event is detected by an accelerometer or another sensor. In some embodiments, instead of or in addition to a message being presented, the action is automatically taken. The message is able to encourage users to perform actions they do not typically perform or enroll in programs/services they are not currently utilizing, ultimately providing better and/or more secure functionality of the mobile device.

DETAILED DESCRIPTION OF THE PREFERRED EMBODIMENT

An acceleration event dependent notification system and method operates so that when an event occurs, a notification is presented suggesting the user to perform an action such as to back up data. In some embodiments, the action is performed automatically when the event occurs. In some embodiments, the notification is presented a first time, and then in subsequent times, the action is performed automatically.

The event is able to be any event, including but not limited to, an accelerometer-detected event, a moisture-detected event, a shock-detected event, an electrical surge-detected event, a heat-detected event, a camera-detected event, determining when a data update occurs such as n number of contacts are entered, determining when m number of days have passed and detection of health of mobile device internal components. Furthermore, a single mobile device is able to implement detection of any one or more of these events.

It is becoming increasingly important to back up mobile device data since a significant amount of contact information and other data is able to be input/acquired/stored as described in U.S. patent application Ser. No. 11/128,121, filed on May 12, 2005 and entitled "ADVANCED CONTACT IDENTIFICATION SYSTEM" and U.S. patent application Ser. No. 12/856,327, filed on Aug. 13, 2010 and entitled "LIVING ADDRESS BOOK" which are both hereby incorporated by reference. In some embodiments, backup of data is performed using the system and method described in U.S. patent application Ser. No. 10/789,816, filed on Feb. 27, 2004 and entitled "WIRELESS TELEPHONE DATA BACKUP SYSTEM" which is herein incorporated by reference.

Figure 1:
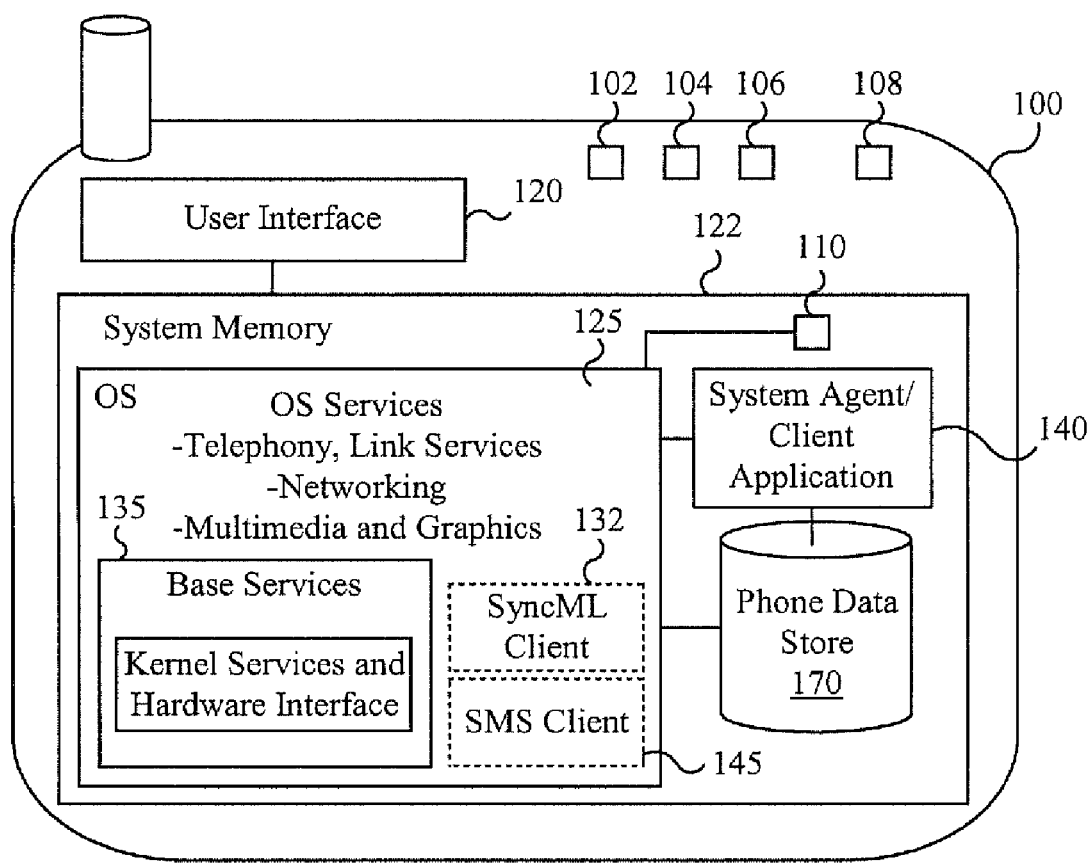
FIG. 1 illustrates a device of an embodiment according to the present invention.

FIG. 1 illustrates a device of an embodiment according to the present invention. A wireless communication device, such as a mobile/wireless phone 100 is able to be provided with a system agent/client application 140. The client application 140 can include a SyncML communication client designed to interact with the SyncML server 195 in accordance with approved and proposed versions of the SyncML OMA DS specification, including proposed extensions (available at http://www.openmobilealliance.org). Alternatively, the client application 140 can be an application designed to communicate with an advanced ID service server 160 using an existing SyncML client 132 on the phone 100 provided by the phone's manufacturer (as well as any custom extensions supported by such SyncML client 132), or an application specifically designed to communicate with the advanced ID service server 160 via another protocol, including a proprietary protocol. In some embodiments, the client application 140 has a fully implemented SyncML communication client and the advanced ID service server 160 includes a SyncML server 195. In some embodiments, the application is a client application device sync agent such as that disclosed in U.S. Pat. No. 6,671,757, which is herein incorporated by reference. Various embodiments of the client application 140 are set forth below.

In accordance with the present invention, the phone 100 includes a system memory 122 which is able to further include an operating system (OS) 125 having operating system services including telephony and linking services, networking services, multimedia and graphics display services all provided to a user interface (UI) 120. The OS 125 is able to be the phone's proprietary OS, BREW, or any other device or operating system suitable for a phone (such as the Symbian Operating system). Additional base services 135 and operating system kernel services are able to also be provided. The operating system 125 is able to additionally provide an SMS client 145 built into the operating system 125 allowing short messages to be provided across the wireless communications link 150 to other users. Still further, the SyncML client 132 is able to be provided and supported by the operating system services. The phone 100 includes a native phone data store 170 which contains an address book of contacts and other information which is able to be provided by a subscriber. Such information can further include ringtones, pictures, sounds, and movies, all dependent on the functional capabilities of the phone 100, the space allowed in the system memory 122, and the services provided by the operating system 125.

The client application 140, various embodiments of which are discussed herein, is also loaded into the phone 100. As will be well understood by one of average skill in the art, the client application 140 can be provided by the phone manufacturer, network operator or downloaded by a user at a later time. To download and install the client application 140, the user selects a download area of the phone operating system 125, selects the client application 140 from offerings provided by the service provider or carrier who maintains the wireless communications link 150, or an enterprise service provider who maintains the advanced ID service server 160, and installs the client application 140 onto the phone 100. In an alternative embodiment, the client application 140 is a self-supporting application designed to run as a JAVA or BREW agent, or any other device or operating system specific agent (such as an agent operable on the Symbian Operating system). This client application 140 can either include its own SyncML communication client, or interact with the existing SyncML client 132 on the phone 100. Changes can occur at field level or byte level. Alternative embodiments can communicate via alternative protocols via the wireless communications link 150 to store information in the user info store 106.

Figure 2:
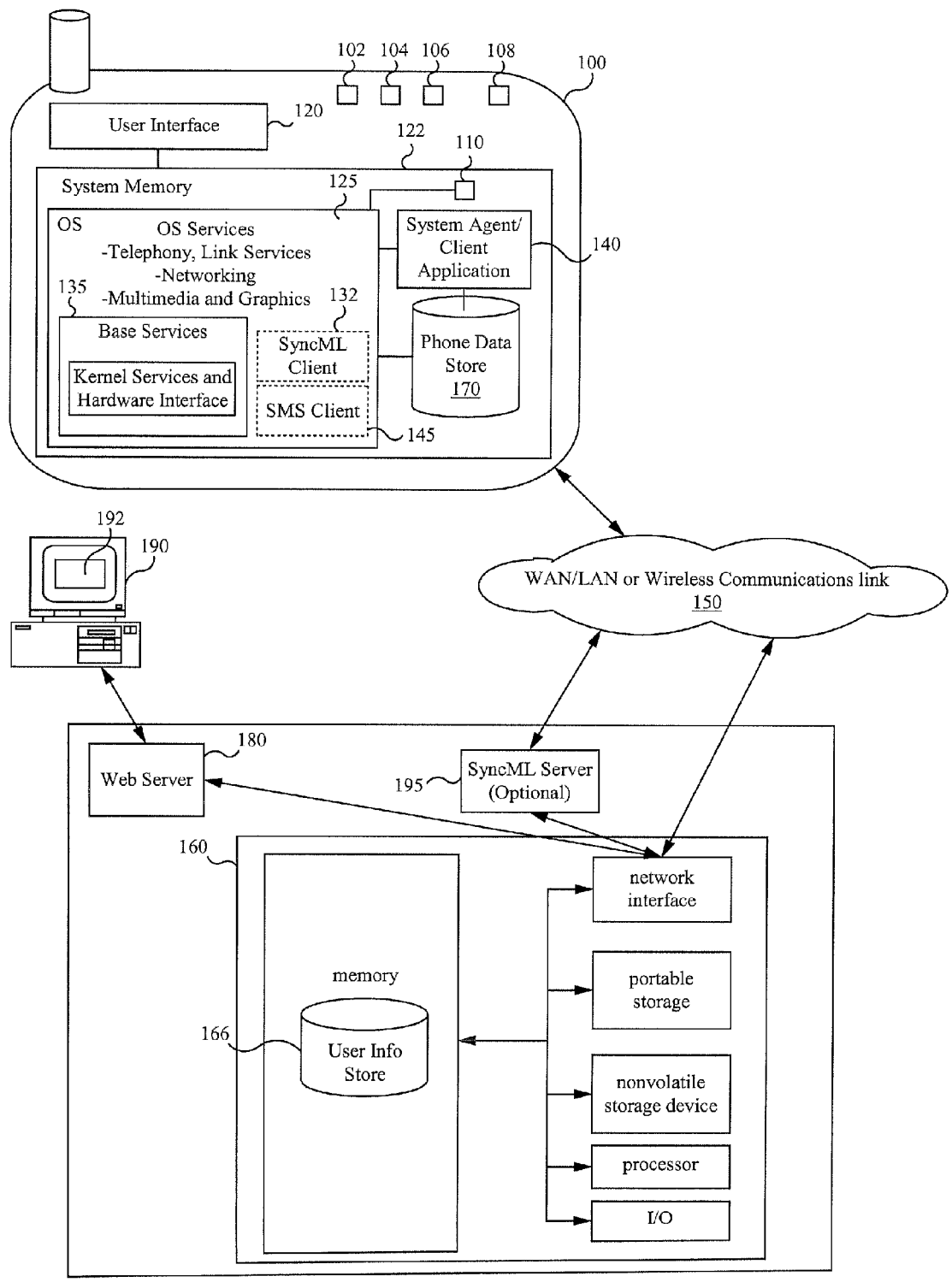
FIG. 2 illustrates a system of an embodiment according to the present invention.

The phone 100 includes at least the user interface (UI) 120, the client application 140 having a communication or sync engine and data store manager, the SyncML client 132 and the phone data store 170. The client application 140 provides an appropriate graphical user interface to the UI 120 which provides the user an alternative point of interaction with the system and service provided by the enterprise service provider. Interaction with the system can be via this phone user interface 120 or via an interface provided by the web server 180 (FIG. 2). The sync engine and data store manager are responsible for maintaining user settings and options in the phone's persistent storage as well as automatically pushing and retrieving changes to and from the advanced ID service server 160 (FIG. 2). The phone data store 170 includes account information, persona data, buddy information, data for other users who have true links with the subscriber, and multimedia content.

The phone 100 also includes one or more sensors to determine if an event occurs. The sensors are able to be implemented in hardware, software or a combination of the two.

An accelerometer 102 is a device for measuring the total specific force on the device which is sometimes referred to as acceleration. The accelerometer 104 is able to be used to determine if a person drops the phone 100. The concern with a dropped phone is that the phone 100 and internal components are able to be damaged from the impact thus rendering the phone 100 inoperable, resulting in a loss of data stored in the phone's memory. A moisture sensor 104 detects moisture which is able to short out or otherwise damage components of the phone. A shock sensor 106 detects shocks or an electrical surge which is able to destroy internal components of the phone. A heat sensor 108 detects heat which is able to melt or damage internal components of the phone. Additional/other sensors are able to be included and implemented to monitor other events.

A monitor application 110 receives information from the sensors and utilizes the information to take action such as displaying a message. The monitor application 110 is also able to monitor events such as elapsed time, the number of database entries, the percent of memory used to store data, the number of changes in the data and other events that affect the data. For example, every 7 days, a message pops up asking a user if he/she would like to backup his/her contact list. In another example, after a user inputs 10 contacts, the user is presented a message asking if a backup of the data is desired. In yet another example, when the percent of memory used surpasses a threshold such as 50%, a message is presented asking if the user would like to perform a backup. In another example, after data has been changed a certain number of times, such as 10 changes, the user is able to be queried about backup.

As described above, the backup is able to occur automatically instead of presenting a question to the user. For example, instead of popping up a message every 7 days, the user's data is able to be automatically backed up every 7 days. In some embodiments, after asking a user to subscribe, future backups are automatic. Furthermore, backup is not the only action that is able to occur during and/or after an event happens. For example, to ensure the memory of the phone 100 does not become full, a message is able to be presented when the memory reaches a threshold, for instance 80% used, to delete data. In another example, if a user drops the mobile device, another possible message is to suggest that the user purchase a protective case.

The monitor application 110 or a separate application is able to monitor system components or environments for events. For example, the monitor application 110 is able to monitor the internal temperature of the phone 100, and when the temperature surpasses a threshold, the phone 100 is able to perform an action such as present a message to the user and/or automatically back up the user's data. Other components to be monitored include, but are not limited to, the screen, battery, processor, memory and so on, such as an inoperable screen or keyboard triggers backup.

Additional/other applications are able to be included and implemented to monitor other events.

FIG. 2 illustrates a system of an embodiment according to the present invention. A phone 100 is coupled to a server 160 through a network 150 such as a Wide Area Network/Local Area Network (WAN/LAN) or wireless communications link. The phone 100 is coupled to the network 150 to transmit voice and data communications to other devices coupling to the wireless network 150. It will be understood that the network 150 is able to be a wireless internet link or a cellular network maintained by a cellular carrier, a GSM or CDMA network, or some other wireless communications link. The carrier is able to comprise the enterprise service provider or is able to be separate from the enterprise service provider. Data is able to be transmitted over the network in any number of known formats.

An advanced ID service server 160 is also provided which communicates with the phone 100 via the wireless network 150 directly over a data connection or via a SyncML server 195. Various embodiments of the system for implementing the advanced contact ID service are discussed further in U.S. patent application Ser. No. 11/128,121. In some embodiments, the advanced ID service server 160 communicates directly with the phone 100. In alternative embodiments, the advanced contact ID system is implemented using a synchronization server such as that described in U.S. Pat. Nos. 6,671, 757, 6,694,336 or 6,757,696.

The advanced ID service server 160 stores user data in the user info store 166 in a manner which associates the data with an individual user of the phone. In some embodiments, the data is stored in bulk—that is all records and information for the individual user are stored in simple text form, (or binary form, depending on the type of data in use). This information is stored in the data store using a unique identifier (UID) associating the personification data with the individual user. The identifier is able to be any randomly selected identifier, so long as the individual user is uniquely identified, and the data is associated with the user. In a further aspect, this user DID is able to be a universally unique identifier (UUID), created in a manner described in the aforementioned U.S. Pat. Nos. 6,671,757, 6,694,336 or 6,757,696 or other manners to create a single ID for a given user. In yet another embodiment, user data and changes to the user data are stored in change logs in a manner described in the aforementioned U.S. Pat. Nos. 6,671,757, 6,694,336 or 6,757,696.

The web server 180 allows the user on a computer or other user device 190 having a web browser 192 to configure aspects of the system of the invention. The web server 180 is able to have a hardware configuration similar to the advanced ID service server 160 and is able to comprise one or more physical computers. Additionally, the web server 180 is able to be integrated with the advanced ID service server 160.

Figure 3:
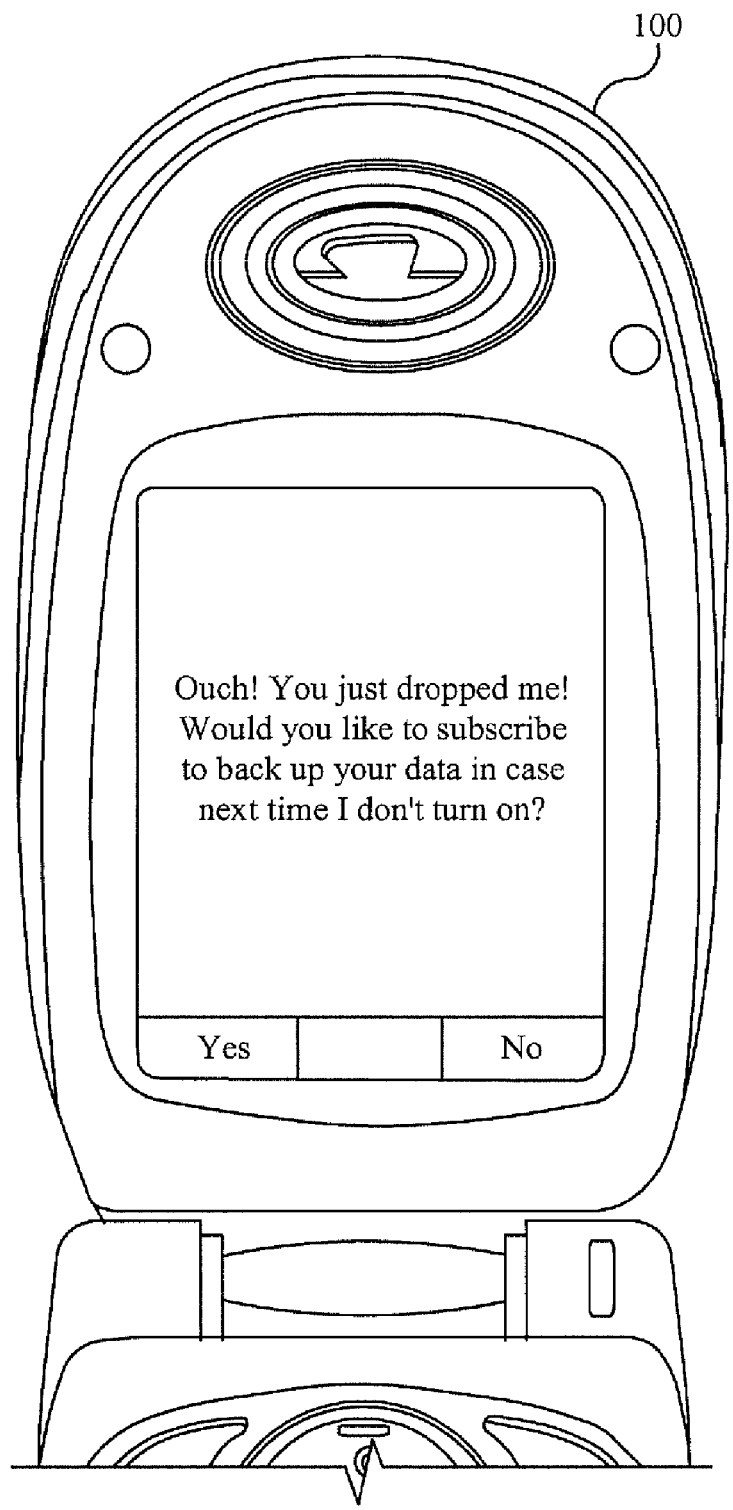
FIG. 3 illustrates a phone of an embodiment according to the present invention.

FIG. 3 illustrates a phone 100 of an embodiment according to the present invention. In some embodiments, the phone 100 displays a message to the user during and/or after an event is detected. For example, a message is displayed during and/or after an accelerometer 102 (FIG. 1) detects that the user dropped his/her phone 100. In some embodiments, the user is queried as to whether or not he/she wants to perform an action such as subscribe to a backup application. The user then responds to the query by inputting a response using a touchscreen, buttons or any other input mechanism. In some embodiments, the backup application is pre-downloaded to the phone but not subscribed to, so that when an event occurs, the user is reminded to subscribe to the product/service. In some embodiments, the backup application has to be downloaded and then subscribed to, so the user is suggested to download and subscribe. In some embodiments, the user is already a subscriber, but has not configured the backup application appropriately, and the user is reminded of such. Any type of suggestion, reminder, hint, question, advertisement or similar presentation is possible.

Figure 4:
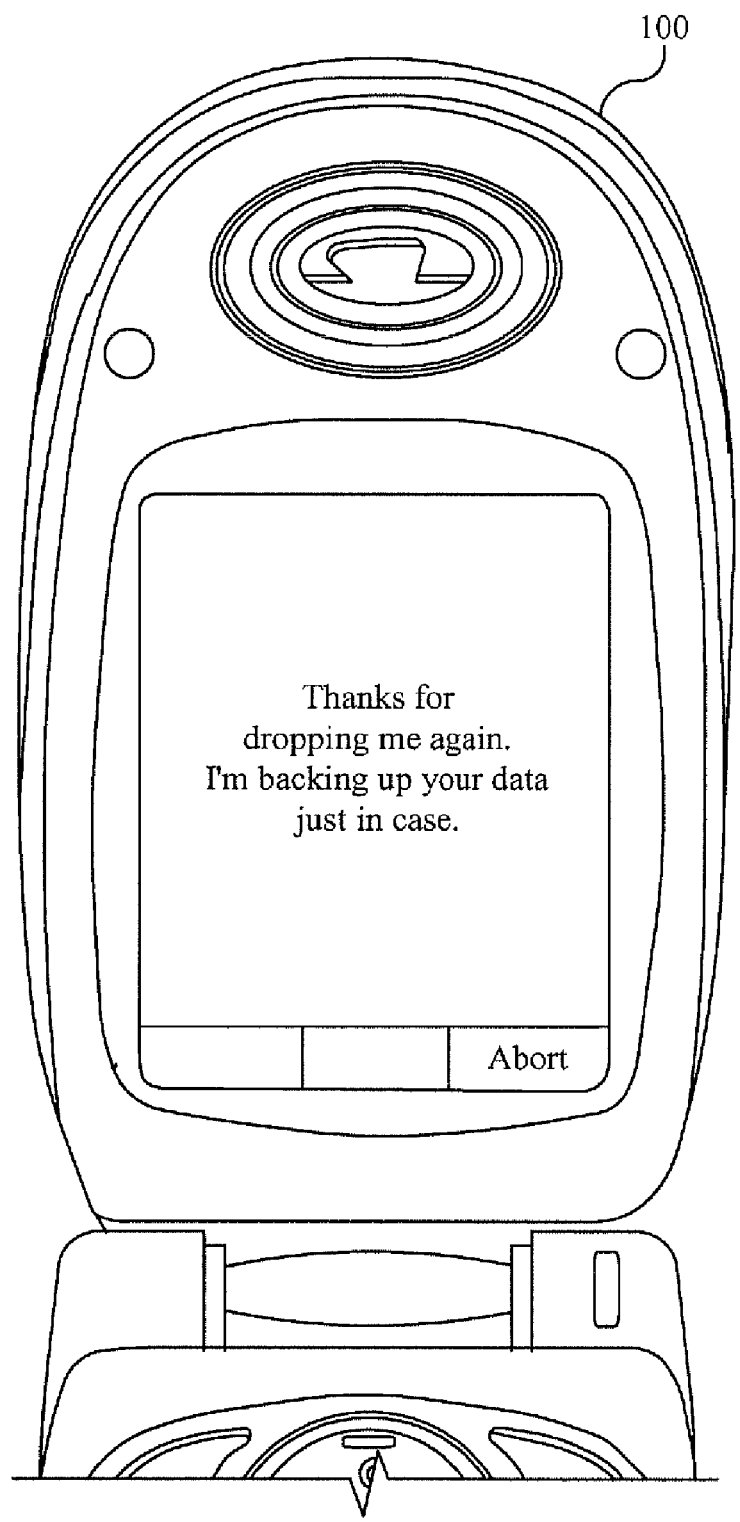
FIG. 4 illustrates a phone of an embodiment according to the present invention.

FIG. 4 illustrates a phone 100 of an embodiment according to the present invention. In some embodiments, the phone 100 displays a message to the user during and/or after an event is detected and has been automatically responded to by performing an action. For example, a message is displayed during and/or after an accelerometer 102 (FIG. 1) detects that the user dropped his/her phone 100 and an application has begun backing up the data. In some embodiments, the user is given an option to abort the action automatically taken. The user is then able to abort by inputting a response using a touchscreen, buttons or any other input mechanism.

Figure 5:
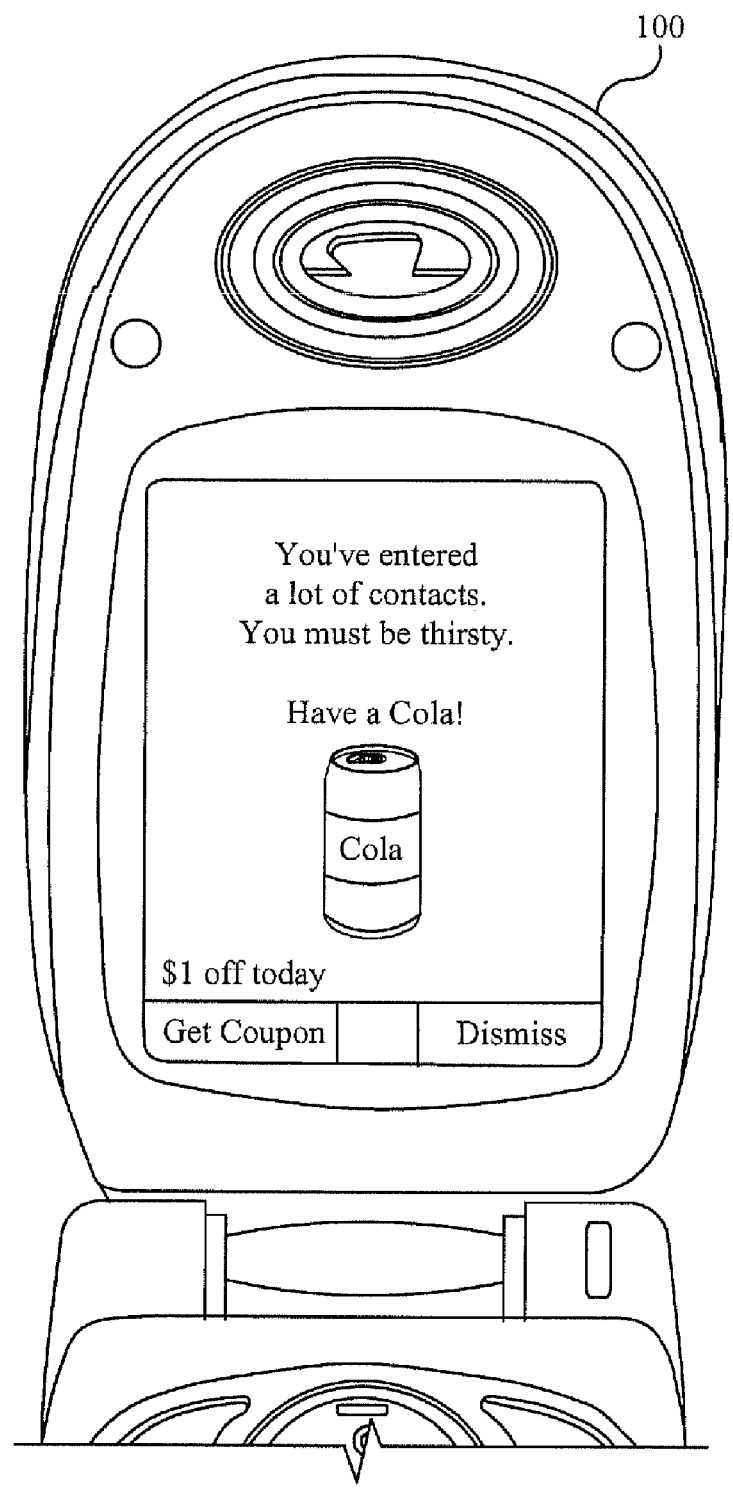
FIG. 5 illustrates a phone of an embodiment according to the present invention.

FIG. 5 illustrates a phone of an embodiment according to the present invention. In some embodiments, the phone 100 displays an advertisement to the user during and/or after an event is detected. For example, after the user has entered in a tenth contact, a Coke® advertisement is displayed.

Figure 6:
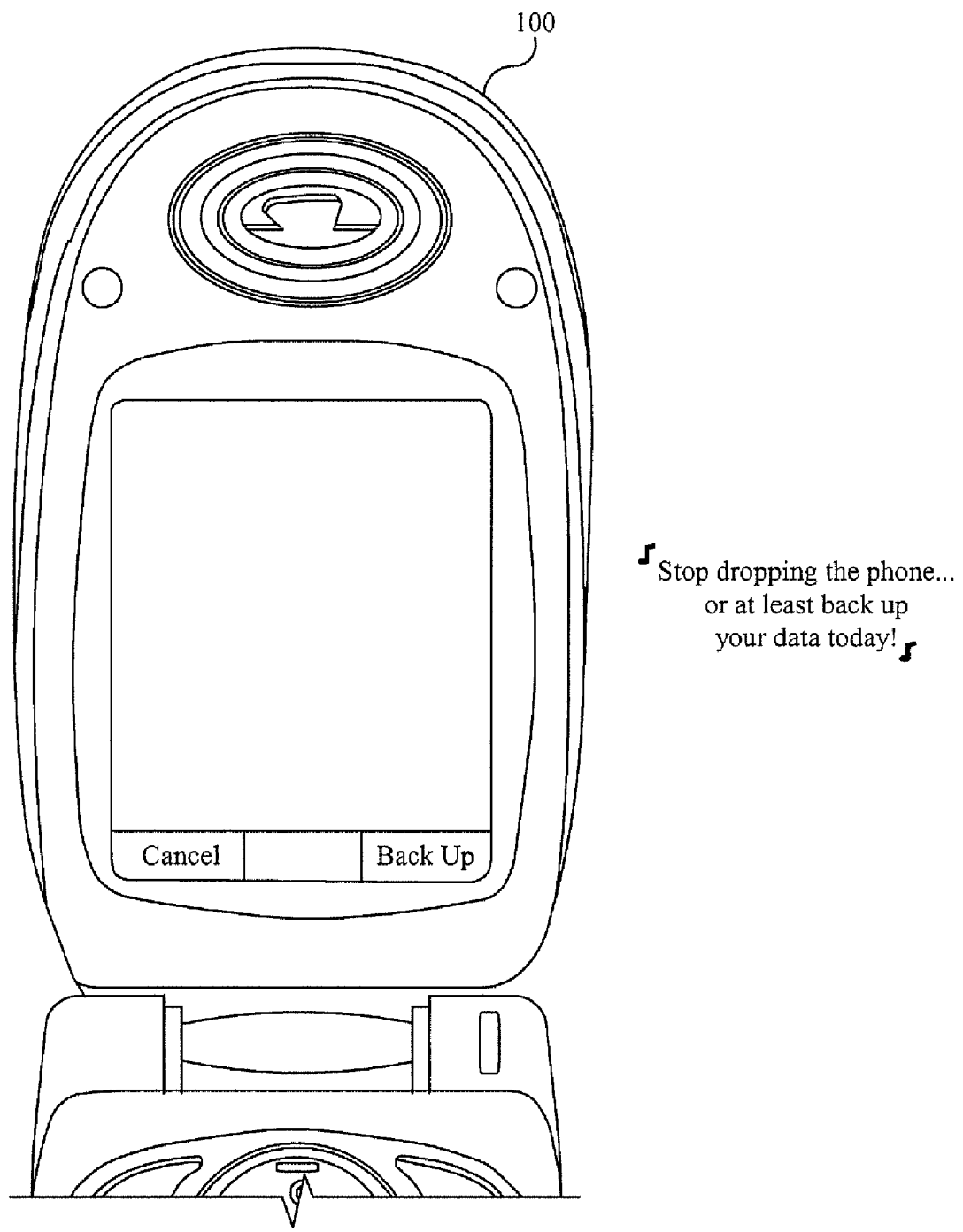
FIG. 6 illustrates a phone of an embodiment according to the present invention.

FIG. 6 illustrates a phone 100 of an embodiment according to the present invention. In some embodiments, the phone 100 presents a sound and/or a voice message to the user during and/or after an event is detected. For example, after the user drops his/her phone, a message is played asking the user if he/she wants to back up his/her data today. The user is provided options to backup the data or not.

Figure 7:
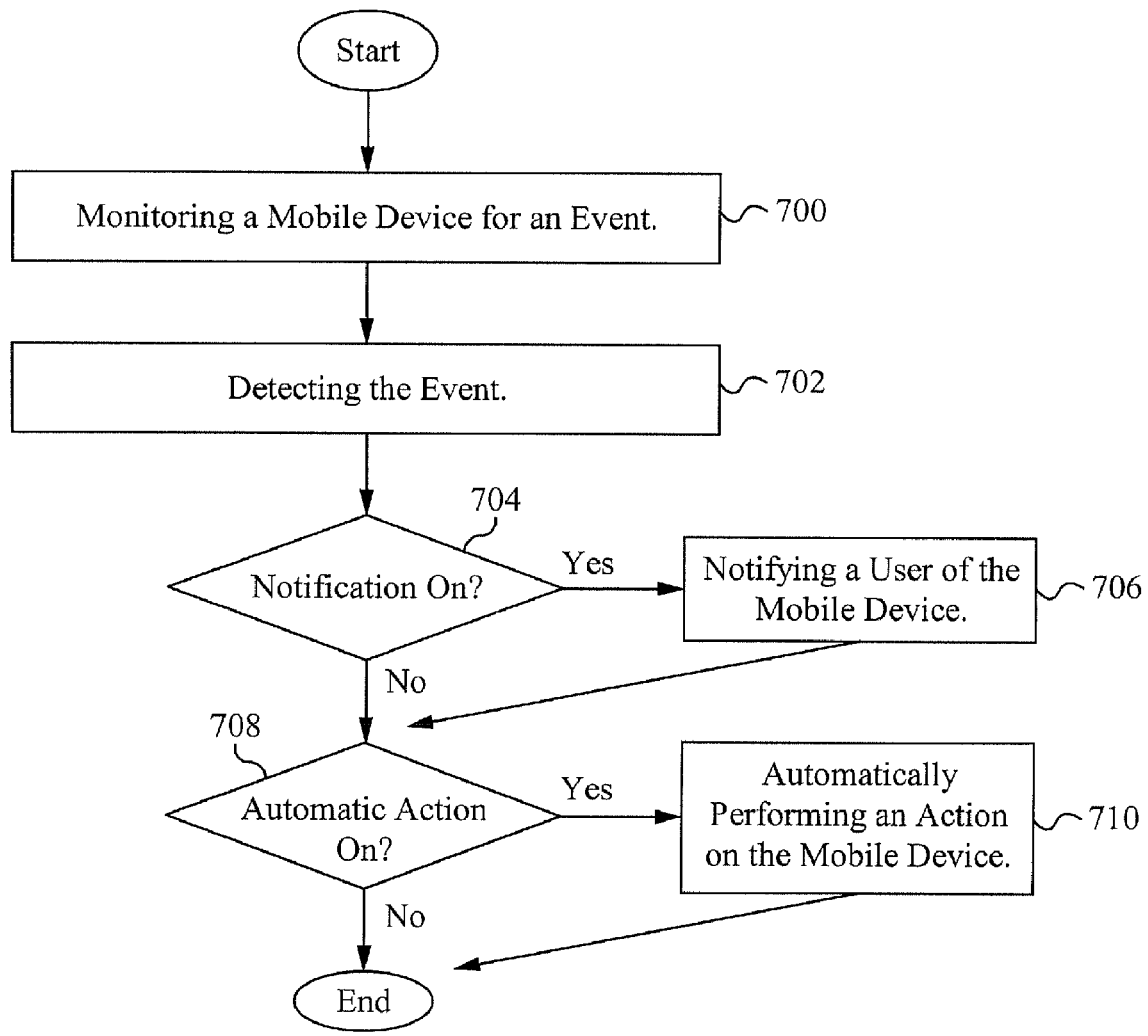
FIG. 7 illustrates a flowchart of an embodiment of the present invention.

FIG. 7 illustrates a flowchart of an embodiment of the present invention. In the step 700, a mobile device is monitored for an event. The event is related to any attribute of the mobile device such as acceleration of a fall, shock, electrical surge, moisture, data storage and/or camera detection, amongst others. The device monitors for these events using hardware such as an accelerometer and/or other sensors and software such as applications which monitor relevant data and components. In the step 702, the event is detected. Detecting the event is able to be any relevant occurrence such as detecting that the mobile device was dropped, detecting moisture, detecting a shock detecting the passage of a specified number of days and/or detecting a specified number of contacts stored on the mobile device which are detectable using the sensors and/or applications. A threshold is able to be set for each event to determine if it is considered a relevant occurrence. For example, the threshold for moisture is not simply an amount greater than 0, it is an amount that reaches the level of concern for the functionality of the phone. Each sensor, component and/or application is able to have a separate threshold. Furthermore, each sensor, component and/or application is able to have multiple thresholds. In some embodiments, the threshold is set by the user, and in some embodiments, the threshold is set by someone other than the user. After the sensor detects the event, information is sent to an application to process the information and determine what step to take. In the step 704, it is determined if notification is enabled. If notification is enabled, then in the step 706, a user is notified that the event has been detected. In some embodiments, the user is notified by a text message being displayed on the screen of the mobile device. In some embodiments, the user is notified in another manner such as an SMS text message, a voice message, a sound alarm, a graphic/icon, an advertisement, a video, a combination of these and/or any other method of informing the user that an event has occurred. After the user is notified, in some embodiments, the user is able to make a selection using the mobile device input such as selecting "yes" to subscribe to a backup service. If notification is not enabled in the step 704 or after the notification is presented in the step 706, it is determined if automatic action is enabled in the step 708. If automatic action is enabled, then an action is performed automatically on the mobile device depending on the event detected, in the step 710. For example, if it is detected that the memory of the mobile device is 80% full which is a set threshold for an automatic backup, then the mobile device automatically begins the backup. If automatic action is not enabled in the step 708, then no actions are automatically taken. In some embodiments, the steps 704, 706 and 708, 710 are switched so that the automatic action is able to take place before notification of the user. In some embodiments, one or more steps are able to be skipped or excluded. For example, if notifications are not included in an embodiment, the process goes to determining if an automatic action is to be executed. In some embodiments, some events are able to have automatic actions, and some events are able to have notifications.

Figure 8:
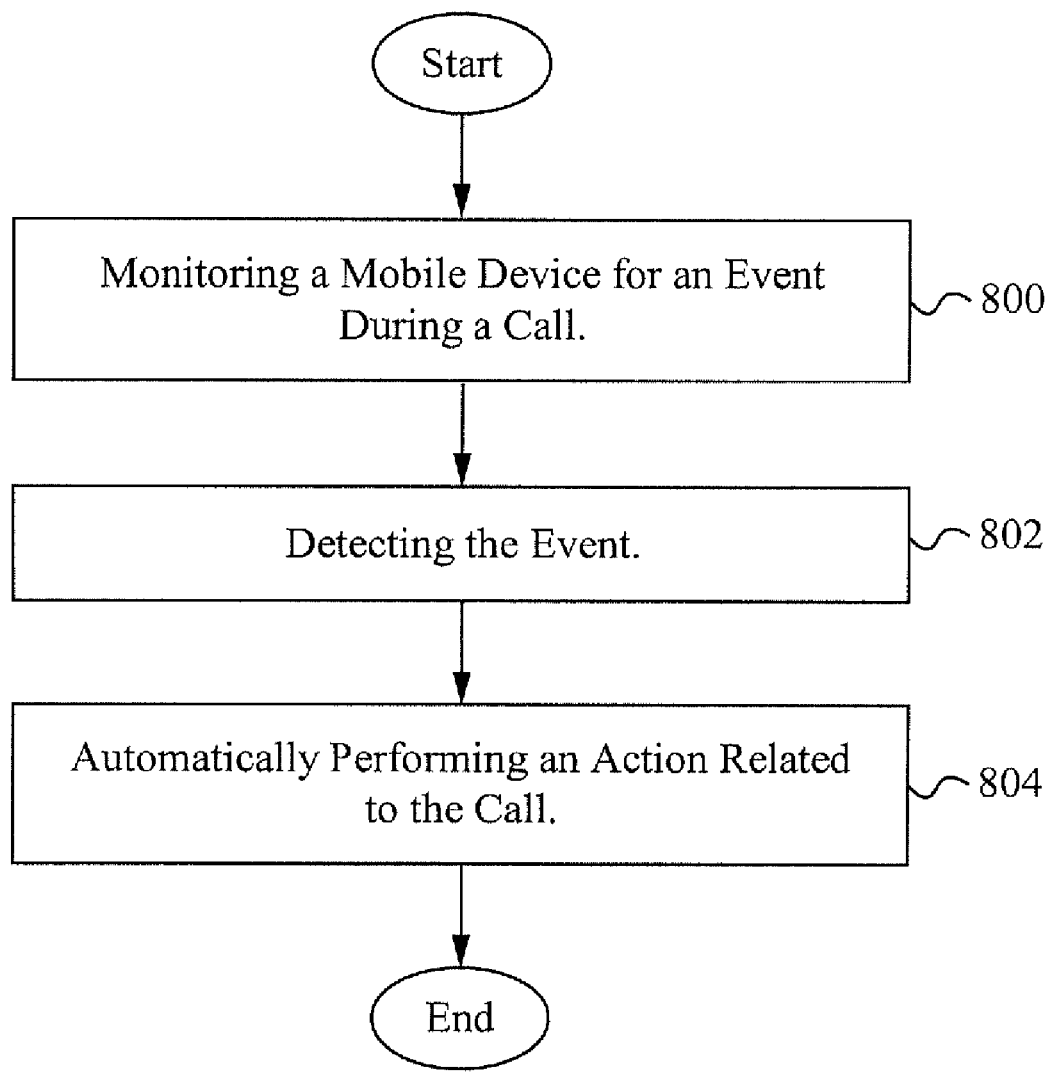
FIG. 8 illustrates a flowchart of an embodiment of the present invention.

FIG. 8 illustrates a flowchart of an embodiment of the present invention. In the step 800, a mobile device is monitored for an event during a call (particularly, when a device is ringing). In the step 802, the event is detected. The event is related to an attribute of the mobile device and a user indicating that the user is attempting to answer the call. Examples of events include, but are not limited to, detecting a user moving towards the mobile device with a camera or a motion sensor, detecting a user moving the mobile device (e.g. lifting the device to the user's ear or the device fumbling in the user's pocket) and detecting the warmth of a user's hand (indicating that the user is holding the device). In the step 804, an action is automatically performed. For example, the actions are able to assist a user in answering a phone call in a timely manner. With a mobile device that includes a camera, if the camera detects a user coming towards to the phone, the mobile device is able to elongate the ring cycle before sending the call to voicemail. An accelerometer is able to determine that the user is moving the phone (e.g. struggling to retrieve the phone from the user's pocket) and elongates the ring cycle. In some embodiments, in addition to or instead of elongating the ring cycle, an indicator is able to be triggered on the calling device that the user is about to answer the call. In some embodiments, a tone, ring tone, music, audio, text and/or other indicators are able to notify the calling user that the call receiving user is about to answer. For example, User A calls User B, and after 5 rings, User B begins approaching the mobile device which usually sends the call to voicemail at 6 rings. Additionally, User A usually hangs up at 6 rings. However, the mobile device's camera detects User B approaching and elongates the ring cycle as well as causes User A's device to play the message, "Stay on the line, I'm coming." Because of the extended ring cycle, User B is able to answer the call before User A hangs up and before the call is sent to voicemail.

As described above, the notification is able to be an advertisement. The advertisement is able to be related to the event such as after a user drops his phone, an advertisement for backup software is presented. The advertisement is also able to be unrelated to the event such as an advertisement for Coke® after inputting every tenth contact.

In some embodiments, when a backup is performed after an event, the backup only backs up user data. In some embodiments, a backup also includes applications downloaded by a user.

In some embodiments, while an event is detected, the mobile device is able to attempt to automatically take precautionary measures to minimize any damage of the event. For example, if a mobile device is falling, a backup to a server is able to occur automatically. If the backup to the server is not possible due to likely time constraints (e.g. a fall typically only lasts a second or two), a backup is possible to apart of memory that is readable even if the mobile device overall becomes inoperable.

In some embodiments, other devices are able to implement the acceleration event dependent notification system and method including, but not limited to, a personal computer, laptop computer, computer workstation, a server, mainframe computer, handheld computer, personal digital assistant, cellular/wireless telephone, smart appliance, gaming console or any other suitable computing device.

To utilize the acceleration event dependent notification system and method, a user utilizes a mobile device as it would typically be used except when an event occurs and the user has to respond to any action presented during and/or after the event. Once the action is presented, in some embodiments, the user responds to a question or follows a suggestion. In some embodiments, the user is able to cancel/abort an action or otherwise let the action perform automatically.

In operation, the acceleration event dependent notification system and method monitors a mobile device using sensors and applications to detect specified events. When an event is detected by a sensor, information is sent to an application which is able to process the information and then act accordingly such as presenting a notification. In some embodiments, the notification includes a question and/or a suggestion about an action to take. In some embodiments, instead of or in addition to the notification, automatic action is taken in relation to the event.

The following is an example of a mobile cellular phone implementing the acceleration event dependent notification system and method. A user purchases the phone which has an accelerometer for detecting a dropped phone, a sensor for detecting moisture, an application for backing up data to a server and an application for monitoring the memory remaining on the phone. Although the phone has backup software, the user has not subscribed to the service that provides the backups. Immediately, the user inputs contact information for 67 friends, family, co-workers and other acquaintances. On the third day of owning the phone, the user drops the phone. The drop triggers the accelerometer which sends a signal to an application which displays a message encouraging the user to subscribe to the backup service to prevent data loss. Upon picking up the phone, the user reads the message and subscribes to the service which then backs up his 67 contacts. After taking a few pictures with his phone and downloading several songs, the memory usage of the device surpasses an 80% threshold which triggers the monitoring application to play a voice message suggesting the user to delete some data. The user chooses to ignore the suggestion and does not delete and data. Upon reaching a 90% threshold, the monitoring application presents an image advertisement to purchase additional memory storage which is able to be plugged into the phone. The user purchases additional memory and is only at 10% capacity with the added memory. A week later, on a rainy day, the phone is not properly protected and the moisture sensor is triggered which sends a signal to the application to present a video advertisement to purchase a waterproof case specially made for this phone. The user follows the advertisement's advice and purchases the waterproof case. From then on, the user's data is backed up periodically, the user has more memory to store songs, pictures, contacts and additional data and the phone is protected from rain because of the waterproof case. Furthermore, three companies benefit from direct advertising with sales.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the appended claims.

What is claimed is:

1. A method of responding to an event detected on a mobile phone of a user comprising:
   a. monitoring a plurality of sensors on the mobile phone for an event, the plurality of sensors comprising a passage of time sensor, a camera, and a memory utilization sensor;
   b. detecting the event, wherein detecting the event comprises detecting the user moving towards the mobile phone using the camera during an incoming call to the mobile phone, the mobile phone being programmed to take a default action when the call is not answered within an initial threshold number of rings;
   c. automatically performing an action in response to the event, wherein the action comprises notifying the user of the occurrence of the event, the notification including a plurality of selectable actions, and performing an action further comprises automatically increasing the threshold number of rings before the default action is taken; and
   d. notifying the caller of an increase in time before the default action occurs, the increase in time resulting from the increase in the threshold number of rings.

2. The method of claim 1, wherein the plurality of sensors include at least one of an accelerometer, a moisture sensor, a shock sensor, a temperature sensor, a number of contacts sensor, and a pressure sensor.

3. The method of claim 2, wherein detecting the event comprises detecting a temperature above a threshold representing the heat of a hand upon the mobile phone during an incoming call to the mobile phone, the mobile phone being programmed to take a default action when the call is not answered within an initial threshold number of rings, and performing an action comprises automatically increasing the threshold number of rings before the default action is taken.

4. The method of claim 1 wherein notifying the user includes at least one of displaying text, presenting an advertisement, sending an SMS text message, playing a voice message, sounding an alarm, playing a video and sending a notification to a server.

5. The method of claim 1 wherein the user selectable action includes subscribing to a product/service.

6. The method of claim 5 wherein the user selectable action includes providing promotional pricing/offers.

7. The method of claim 1 wherein the event includes a threshold being reached.

8. The method of claim 7 wherein automatically performing the action includes backing up information stored on the mobile phone.

9. The method of claim 8 wherein automatically performing the action includes notifying a server/service of the event.

10. The method of claim 1, wherein the selectable actions comprise one of: backing up the mobile phone memory, getting a coupon associated with an advertisement presented to the user, deleting data, powering off the mobile phone, and purchasing additional memory.

11. The method of claim 10, wherein detecting the event comprises detecting that memory utilization exceeds a threshold value.

12. The method of claim 10, wherein detecting the event comprises detecting the elapse of a threshold value of time.

13. The method of claim 10, wherein detecting the event comprises detecting that a threshold number of contacts have been entered on the mobile phone.

14. The method of claim 10, wherein detecting the event comprises detecting a surge in an electrical supply that exceeds a threshold value.

15. The method of claim 10, wherein detecting the event comprises detecting a temperature in the mobile phone exceeding a threshold value.

16. The method of claim 10, wherein detecting the event comprises detecting a moisture sensor in the mobile phone exceeding a threshold value and the selectable actions comprise purchasing a protective case for the mobile phone.

17. The method of claim 10, wherein the plurality of sensors further comprise one of a display screen sensor, a battery sensor, a processor sensor, and a keyboard sensor and detecting the event comprises detecting a failure of the hardware associated with the additional sensor.

18. A system comprising:
   a. a server; and
   b. a mobile phone coupled to the server, the mobile phone including:
      i. a plurality of sensors for detecting an event, the plurality of sensors comprising a memory utilization sensor, a camera, and a time passage sensor; and
      ii. one or more applications operatively coupled to the plurality of sensors, the one or more applications configured to:
         (1) receive information from the plurality of sensors;
         (2) detect an event by the plurality of sensors, wherein detecting the event comprises detecting the user moving towards the mobile phone using the camera during an incoming call to the mobile phone, the mobile phone being programmed to take a default action when the call is not answered within an initial threshold number of rings;
         (3) automatically performing an action in response to the event, wherein the action comprises notifying the user of the occurrence of the event, the notification comprising a plurality of selectable actions for responding to the event, and performing an action further comprises automatically increasing the threshold number of rings before the default action is taken; and
         (4) notifying the caller of an increase in time before the default action occurs, the increase in time resulting from the increase in the threshold number of rings.

19. The system of claim 18 wherein the plurality of sensors include at least one of an accelerometer, a moisture sensor, a shock sensor, a heat sensor, an electrical surge sensor, a time passage sensor, and a number-of-contacts sensor.

20. The system of claim 18 wherein notifying the user includes at least one of displaying text, presenting an advertisement, sending an SMS text message, playing a voice message, sounding an alarm, playing a video and sending a notification to a server.

21. The system of claim 18 wherein notifying the user includes suggesting the user to subscribe for a product/service.

22. The system of claim 18 wherein the event includes a threshold being reached.

23. The system of claim 18 wherein the one or more applications automatically perform an action in response to the event.

24. The system of claim 23 wherein the action includes backing up information stored on the mobile phone to the server.

25. The system of claim 24 wherein the information comprises user-entered information.

26. The system of claim 18 wherein the one or more applications monitor one or more data events.

27. The system of claim 26 wherein the one or more data events include at least one of an amount of elapsed time, a database update, a percent of memory used and an amount of data changes.

* * * * *